United States Patent [19]

Hamano et al.

[11] Patent Number: 5,510,839
[45] Date of Patent: Apr. 23, 1996

[54] IMAGE ENCODING AND TRANSMITTING SYSTEM

[75] Inventors: Takashi Hamano; Kiyoshi Sakai; Kiichi Matsuda, all of Kawasaki, Japan

[73] Assignee: Fujitsu Limited, Kanagawa, Japan

[21] Appl. No.: 909,044

[22] Filed: Jul. 6, 1992

[30] Foreign Application Priority Data

Jul. 4, 1991 [JP] Japan .................. 3-164422

[51] Int. Cl.6 .................................. H04N 7/50
[52] U.S. Cl. .................... 348/402; 348/407; 348/423
[58] Field of Search .................... 358/105, 136, 358/141, 167; 348/400, 401, 402, 407, 423; H04N 7/137

[56] References Cited

U.S. PATENT DOCUMENTS

| | | | |
|---|---|---|---|
| 4,807,053 | 2/1989 | Heijnemans | 358/105 |
| 4,837,618 | 6/1989 | Hatori | 358/136 |
| 4,982,285 | 1/1991 | Sugiyama | 358/136 |
| 5,134,477 | 7/1992 | Knauer | 358/105 |
| 5,247,363 | 9/1993 | Sun | 358/105 |

FOREIGN PATENT DOCUMENTS

| | | |
|---|---|---|
| 0267581 | 5/1988 | European Pat. Off. . |
| 0395440 | 10/1990 | European Pat. Off. . |
| 59-185487 | 10/1984 | Japan . |
| 61-15485 | 1/1986 | Japan . |
| 62-48188 | 3/1987 | Japan . |
| 3-295380 | 12/1992 | Japan . |

Primary Examiner—Howard W. Britton
Attorney, Agent, or Firm—Greer, Burns & Crain, Ltd.

[57] ABSTRACT

An image encoding and transmitting system is an image transmission system for transmitting digital data such as TV telephones. The system for dividing input frame data into a plurality of blocks before transmitting them comprises on its sending side an intra-frame/inter-frame determiner for receiving intra-frame data and inter-frame data and selecting either of them for output, and a difference collator for having the intra-frame/inter-frame determiner compulsorily output intra-frame data at the time of data input for the next frame when one or more data in each block forming inter-frame data are larger than a predetermined threshold. The system also comprises on its receiving side an picture element domain frame data storage for storing received data in the picture element domain, and a motion vector detector for detecting according to the contents in the storage a motion vector using the data in the block surrounding the discarded block in order to guess the data in the discarded block.

6 Claims, 23 Drawing Sheets

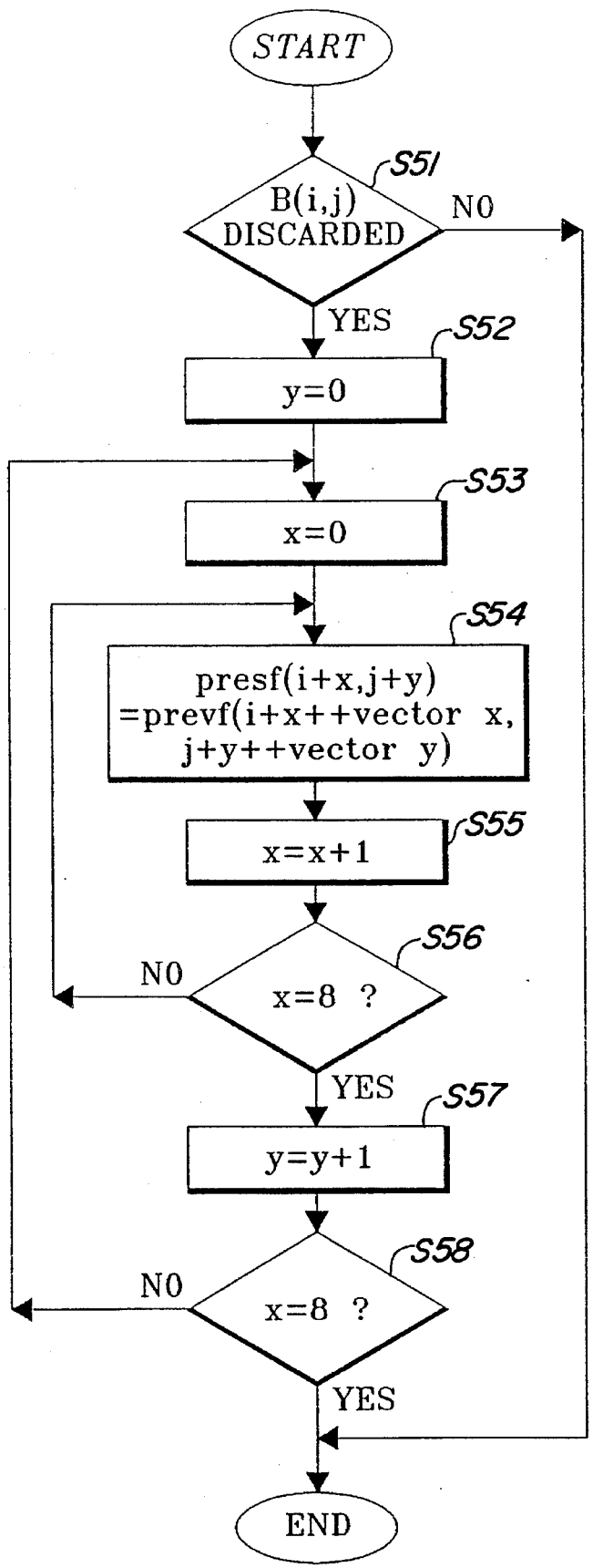
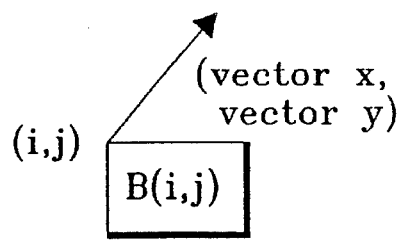
Fig. 20

IMAGE ENCODING AND TRANSMITTING SYSTEM

BACKGROUND OF THE INVENTION

The present invention relates to an efficient image data encoding system used in a digital transmission of TV telephone and TV conference data by an NTSC method, or in a digital transmission of high-definition TV (HDTV) data, and more specifically to an image encoding and transmitting system used in an image transmission system for dividing input frame image data into a plurality of blocks comprising a plurality of picture elements, encoding them in block units, and transmitting the encoded data in cell units.

An asynchronous transfer mode (ATM) has been widely accepted and is being standardized to realize a broadband ISDN, a new generation network. In the ATM, data are put into a single format "cell" (a fixed length packet) and transmitted by a label multiplexing technology. In the image communication field, it is as an efficient improvement in the utilization of lines and regenerated image quality through a variable bit rate transmission. However, in an efficient encoding system based on an inter-frame encoding process, the quality of images are badly deteriorated if a cell-discarding operation makes an error in image data during transmission. Therefore, an efficient encoding system having a cell-discard compensation function is earnestly required.

Recently, various image data processors have been digital oriented, and new systems for transmitting digital image data signals have been extensively developed in many application fields such as TV telephones, etc. Generally, image data involves a large volume of information when transmitted. For example, when TV data are digitized, they require 100 Mb/s transmission capacity and involve 1,500 times as much as voice data. In a TV broadcast, a screen is switched 30 times in a second, and a frame is switched every ⅓₀ second. Normally, picture elements are arranged in a two-dimensional array in one screen corresponding to one frame. Therefore, there has to be a large volume of information for image data of one frame even though the density of one picture element can be represented by 8 bits.

However, the contents of an image in each frame may not vary greatly even when a frame is switched every ⅓₀ second. That is, a large part of an image may be static, for instance a sky scene or a scene in a background. Only a small part of it varies in each frame. Therefore, an inter-frame encoding system has been developed to compress and encode image data.

In the inter-frame encoding system, for example, the difference in density data is obtained between corresponding image pictures in two time-series frames. The difference is encoded by a Huffman code, for example, and transmitted to the transmission line. If the density does not vary for most picture elements, the difference between picture elements results in "0" and can be represented by about 2 bits. A large difference between picture elements requires 8 or more bits. However, since only large differences must be encoded, total transmission data can be greatly compressed. By contrast, a system of encoding data in 1 frame "as is" is referred to as an "intra-frame encoding system."

In the inter- and intra-frame encoding systems, two basic operations "sampling" and "quantization" are required for representing image signals digitally. There are two methods of sampling an image. First, an image is sampled by representing by density values for a discrete point array corresponding to picture elements. Second, a density value function (image function) defined on the XY plane corresponding to a frame plane is expanded orthogonally, and the expansion coefficient is determined to be a sampling value.

FIG. 1 is a block diagram for explaining the general configuration of the image transmission system using an orthogonal transform. In FIG. 1, noises are removed through a filter from inputted image data by a preprocessor 1, and picture element data are divided in block units. The block-division does not mean an orthogonal transform collectively performed on data comprising K×N picture elements in a two-dimensional array in one frame, but is performed to shorten the transformation time by obtaining a transformation coefficient for each block comprising 4×4 to 16×16 picture elements.

In a source encoder 2, data are quantized for the reduction of bits after the inter-frame encoding, the transformation-encoding, etc. as encoding processes for removing redundancy in space and time directions. The orthogonal transforms performed in this technology are, for example, Adamar transform, cosine transform, Karounen Roebe transform, etc. Among them, the discrete representation in cosine transforms is commonly used, and the discrete cosine transform (DCT) is applied most.

In such orthogonal transformation-encoding systems, the inter-relation in a small area is regarded and an orthogonal transform is performed using picture elements of a small area as a numerical string. The resultant transformation coefficient corresponds to a frequency component indicating each level ranging from a low frequency to a high frequency. Since an image signal normally predominantly has a low frequency component rather than a high frequency component, a larger number of bits are assigned to a low frequency component and a smaller number of bits to a high frequency component prior to the quantization. Thus, the volume of transmission data can be reduced greatly.

FIG. 1 shows a variable length encoder 3 for encoding data by a Huffman code, run-length code, etc. to eliminate statistical redundancy, and a cell assembler 4 for assigning side information for detecting cell-discard and a header to a cell. Thus, an assembled cell is outputted through a network.

On the receiving side, a cell disassembler 5 detects cell-discard in a cell inputted through the network, and the cell is disassembled to data. Then, the received bit string is decoded by a variable length decoder 6, and image data are decoded by a source decoder 7 by performing the source encoding process in reverse. Then, a post-processor 8 performs an unblock process a noise removal process using a filter, etc., and the data are outputted.

FIG. 2 is a block diagram for explaining the configuration for the inter-frame DCT encoding system as the first example of a typical conventional encoding system. In FIG. 2, a subtracter 11 on the sending side calculates the difference between inputted image data divided into block data and the data obtained by multiplying the block data stored in a frame memory 9 at the same block position but in the preceding frame by the leak coefficient α provided by a leak coefficient unit 10. The difference and the inputted data are applied to an intra-frame/inter-frame determiner 12 for determining which is effective, to encode the data in the present frame, that is, to encode the intra-frame data as is, or to encode the difference between the data in the present frame and those at the corresponding position in one frame before the present data. The data determined to be more effective are applied to a discrete cosine transform (DCT) unit 13, and quantized by a quantizer 14.

The output of the quantizer 14 and the intra-frame/inter-frame determination result indicated by the broken line shown in FIG. 2 are outputted to the variable length encoder 3 shown in FIG. 1. Simultaneously, the output of the quantizer 14 is inversely transformed again to the picture element domain by an inverse discrete cosine transform (IDCT) unit 15, added by an adder 16 to the product obtained by multiplying the data stored in the frame memory 9 by $\alpha$ from the leak coefficient unit 10, and then stored again in the frame memory 9. However, when an intra-frame data encoding is selected, the adder 16 does not add the data in the prior frame according to the input of a determination signal as shown by the broken line, but stores the output of the IDCT unit 15 as is in the frame memory 9.

In FIG. 2, on the receiving side, the input data are inversely transformed to the picture element domain by an IDCT unit 17. The result is added by an adder 20 to the data obtained by multiplying the data in the preceding frame stored in a frame memory 18 by # from a leak coefficient unit 19, and then outputted to the post-processor 8 shown in FIG. 1 and stored again in the frame memory 18. When an intra-frame data encoding is selected, the data in the prior frame are not added. For a block which does not receive data due to cell-discard, the prior frame data is added to the input 0, and the result is stored in the frame memory 18. That is, at the cell-discard, the prior frame data are stored as is to the frame memory 18.

In FIG. 2, both on the sending and the receiving sides, the leak coefficient unit exists between the output of the frame memory and the adder. The product obtained by multiplying the output of the frame memory by the leak coefficient $\alpha$ is used as a value of the data in the preceding frame. If the leak coefficient $\alpha$ is set to a value between 0 and 1 and an error E arises between the contents stored in the frame memories on both the sending and the receiving sides, the error results in $E \times \alpha^n$ after n frames. The error gradually gets smaller with time, and finally converges to zero. Therefore, the quality of a regenerated image can be restored when the error value has decreased down to near zero even though an error E has arisen on the sending and the receiving sides due to cell-discard and has incurred the deterioration in the quality of a regenerated image.

FIG. 3 is a block diagram for explaining the configuration for realizing the DCT inter-frame encoding system as the second embodiment of the conventional encoding system. The configuration of this system is similar to the system shown in FIG. 2 except the following points: the discrete cosine transform (DCT) unit 13 is located in the source encoder 2, the input image data are transformed by the DCT unit 13 to a frequency domain coefficient, and the inter-frame or intra-frame data encoding system is selected for the transformed coefficient data.

On the receiving side, data in the frequency domain are decoded using the frame memory 18 depending on the selection of the inter-frame or intra-frame encoding system. The result is transformed by the IDCT unit 17 to the picture element domain, and outputted to the post-processor 8.

FIG. 5 is a configurational block diagram for explaining a second example of the motion compensation inter-frame DCT encoding system of the prior art technology. It is similar in its configuration to FIG. 2 showing the first example of the prior art technology. However, since the intra-frame encoding system is not used in the operation shown in FIG. 5, the intra-frame/inter-frame determiner 12 is not provided on the sending side. Instead, a motion vector detector 100 for detecting a motion vector of each block according to inputted data and the data in the preceding frame stored in the frame memory 9 and a variable delay unit 101 for delaying the contents stored in the frame memory 9 and outputting them to the leak coefficient unit 10 are added to the sending side.

Also on the receiving side, a variable delay unit 102 for delaying by the necessary time period the data in the preceding frame stored in the frame memory 18 according to a motion vector received from the sending side and outputting them to the leak coefficient unit 19 is added.

In the conventional encoding system shown in FIGS. 2 and 3, the image quality can be automatically restored with time using a leak coefficient $\alpha$ even though the quality of an image has deteriorated due to cell-discard. For a block in which the time difference is comparatively small between the previous frame and the present frame, an error in the image data between the sender and the receiver is small, and can rapidly converge to zero using the leak coefficient. Therefore, the deterioration of the image quality can be limited to a visually permissible level. However, for a block in which the time difference is comparatively large, the error between these image data becomes large and the deterioration in the image quality is badly outstanding when the cell-discard rate is high because the error takes considerable time in converging using a leak coefficient.

SUMMARY OF THE INVENTION

An object of the present invention is to shorten the time taken for restoring the deteriorated quality of an image, that is, for converging to zero the error in the image data between a sender and a receiver caused by cell-discard. Another object of the present invention is, when cell-discard has arisen, to minimize an error in an image data between a sender and a receiver by predicting using a motion vector, a data block in which the cell-discard has arisen.

A feature of the present invention relates in an image encoding and transmitting system for dividing inputted frame image data into a plurality of blocks comprising picture elements, encoding them in block units, and transmitting said encoded data in packet units, said system comprising on its sending side, intra-frame/inter-frame determining means for receiving inputted frame and the first difference data as the difference between inputted frame data and data obtained by multiplying the inputted frame data in the preceding frame by a constant $\alpha$, and selecting and outputting either of the intra-frame data as the inputted frame data or the inter-frame data as the first difference data, and difference collating means for receiving second difference data between said inputted frame data and the data in one frame before the present frame, and having said inter-frame/intra-frame determining means compulsorily output the intra-frame data at the data input of the next frame for the same block position when fore tMan one piece of data in each block forming the second difference data are larger than a predetermined threshold.

BRIEF DESCRIPTION OF THE DRAWINGS

One of skill in the art will understand additional features and objects of this invention from the description of the preferred embodiments and some of the attached drawings. In the drawings:

FIG. 11 shows the concept of the motion vector detecting system in the second principle (at a normal reception);

FIG. 12 shows the concept of the motion vector detecting system in the second principle (of the prior art technology);

FIG. 13 shows the concept of the motion vector detecting system in the second principle (of the present invention);

FIG. 20 is a flowchart of an embodiment of a data replacing process using a motion vector;

DESCRIPTION OF THE PREFERRED EMBODIMENT

FIG. 5 is a block diagram for explaining the principle of the present invention. It shows the principle of the image encoding and transmitting system used in an image transmission system in which image data in an inputted frame are divided into blocks each comprising a plurality of picture elements, the data are encoded in block units, and the encoded data are transmitted in cell units.

For the detailed explanation of the present invention, a transmission method in which encoded data are transmitted in an ATM cell, for example. However, an encoded data transmission method is not limited to the method using the ATM cell, but can be realized using any kind of packet such as variable length packets, fixed length packets, etc.

FIG. 5 is a block diagram for explaining the first principle. It shows the principle of the image encoding and transmitting system for minimizing the influence of cell-discard by performing a compulsory intra-frame encoding on the frame data after the data having a comparatively large difference are transmitted through an inter-frame encoding so as to prevent the image quality from being greatly deteriorated when data having a large difference are cell-discarded.

Figure 5A:
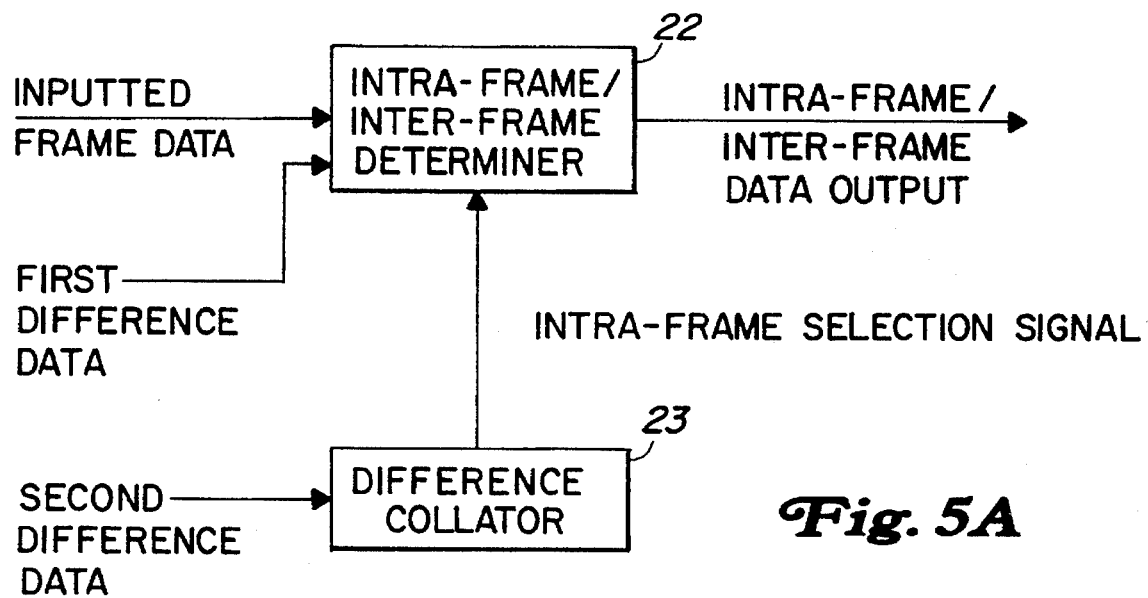
FIG. 5A and 5B are a block diagrams for explaining the principle of the present invention.

In FIG. 5A, an intra-frame/inter-frame determiner 22 receives inputted frame data and the first difference data which indicate the difference between the inputted frame data and the data in the preceding frame or between the inputted frame data and the data obtained by multiplying the data in the preceding frame by a constant, for example, a leak coefficient α, and selects and outputs either of the intra-frame data as the inputted frame data or the inter-frame data as the first difference data. The selection is determined by calculating a sum of squares of data in each block, collating the sums of squares for an intra-frame data and an inter-frame data, and selecting and outputting whichever has a smaller sum of squares. Thus, the length of the data code transmitted to the receiving side can be shortened.

A difference collator 23 receives the second difference data between the inputted frame data and the data in one frame before the present frame, and causes the inter-frame/intra-frame determiner 22 to compulsorily output the intra-frame data when the data at the same block position in the next frame are inputted when more than one piece of data in each block forming the difference data is larger than a predetermined threshold. Although comparatively large difference data are inter-frame -encoded, transmitted, and then cell-discarded, the quality of the image can be prevented from being deteriorated by intra-frame-encoding the next frame data. The inter-frame/intra-frame determiner 22 and the difference collator 23 are provided on the sending side in an image transmission system.

Figure 5B:
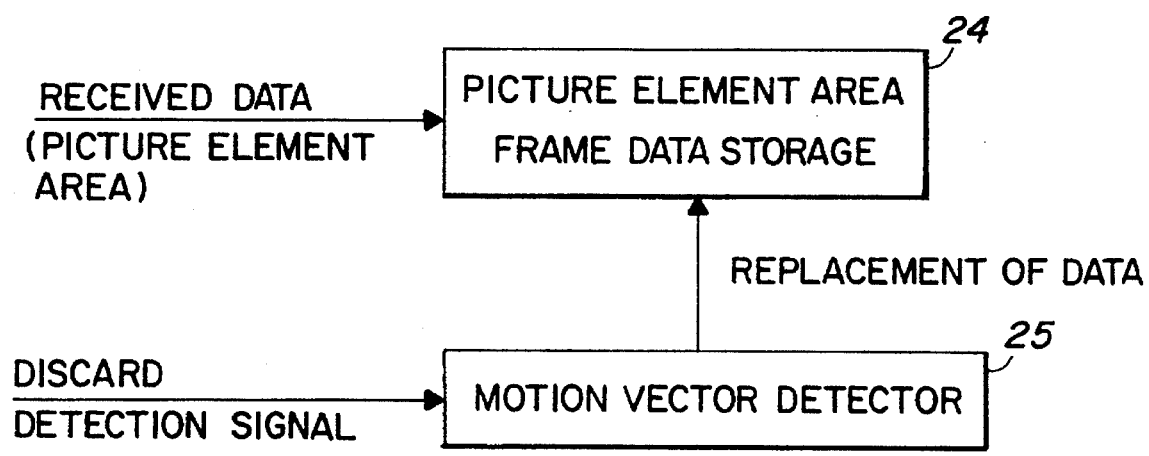

FIG. 5B is a block diagram for explaining the principle of the second embodiment. It shows the principle of the image encoding and transmitting system for predicting data in a block whose data were not received due to cell-discard by detecting a motion vector using the data in the blocks surrounding the missing block.

In FIG. 5B, a picture element domain frame data storage 24 is, for example, a frame memory, and stores received image data in a picture element domain. If image data are transmitted as a coefficient of a frequency domain orthogonally transformed in the transmission line, they are stored in the picture element domain frame data storage 24.

A motion vector detector 25 detects a motion vector using the data in the blocks surrounding the block whose encoded data were not received due to cell-discard among the frame data stored in the picture element domain frame data storage 24 when a cell-discard detection signal is inputted. The motion vector detector 25 replaces data using this motion vector. The picture element domain frame data storage 24 and the motion vector detector 25 are provided on the receiving side in an image transmission system.

As shown in FIG. 5A for explaining the first principle, an object of the present invention is to shorten the time taken for converging to zero an error caused by cell-discard in image data between a sender and a receiver, that is, to shorten the time taken for reconstructing discarded data in a block having a large inter-frame difference. If the inter-frame encoding system is performed in spite of a comparatively large inter-frame difference, the data at the same block position in the next frame are compulsorily intra-frame-encoded. Therefore, the next frame can be encoded without the influence of the preceding frame even though a large difference block data may be discarded, thereby greatly shortening the time taken for restoring acceptable image quality.

As shown in FIG. 5B, for explaining the second principle of the present invention, a motion vector is detected when a cell-discard detecting signal is inputted to the receiving side so that determination can be made as to which position of a block in the preceding frame replaces the discarded block. Thus, data are replaced using the motion vector. However, a motion vector cannot be obtained directly from the discarded block, but can be obtained indirectly using a surrounding block not affected by the cell-discard.

In the first system of obtaining a motion vector for replacing block data, motion vectors each for one or more blocks not affected by cell-discard are obtained. Then, an average value of the motion vectors is calculated as a replacing motion vector. In the second system, a general motion vector is detected in one block group comprising one or more blocks not affected by cell-discard. It is used as a replacing motion vector.

In FIG. 5B for explaining the second principle, the picture element domain frame data storage 24 stores received image data in the picture element domain. Among the frame data stored here, block data not received due to cell-discard are replaced by the motion vector detector 25. If encoded data in the coefficient domain orthogonally transformed in the transmission line are transmitted, a second frame memory for storing the frame data in the coefficient domain as well as a frame memory corresponding to the picture element domain frame data storage 24 are provided on the receiving side. When cell-discard has arisen, block data in the preceding frame stored in the second frame memory are inversely transformed to the picture element domain. Then, the inversely-transformed data are stored in a frame memory corresponding to the picture element domain frame data storage 24.

As described above, when data having a comparatively large inter-frame difference are transmitted, an intra-frame encoding is compulsorily selected for the same block position in the next frame, and, on the receiving side, the data in the discarded block can be replaced using a motion vector for the blocks surrounding the discarded block.

Figure 6A:
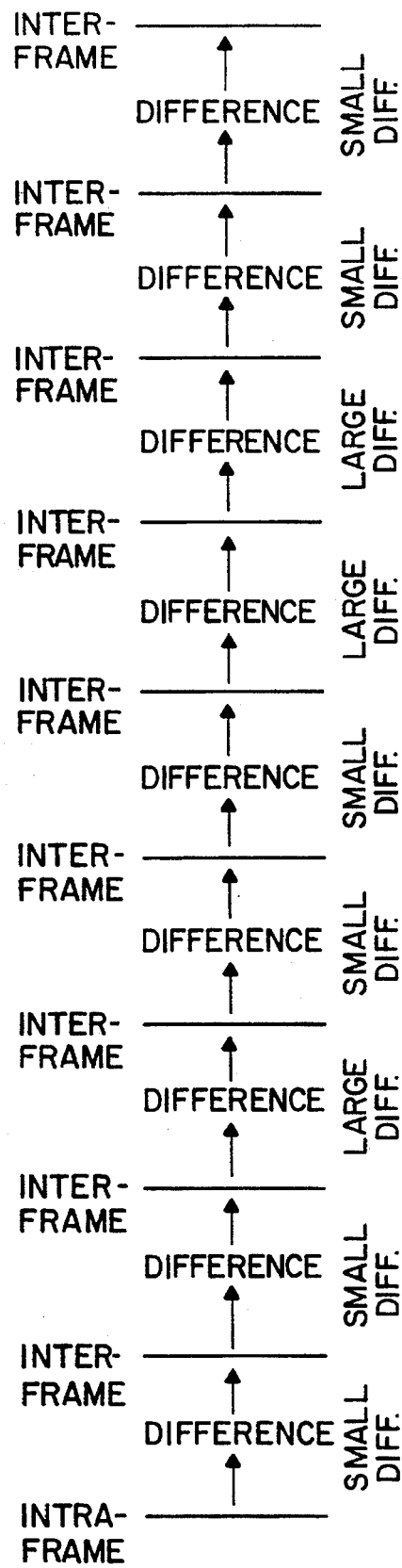
FIGS. 6A and 6B show the concept of the compulsory intra-frame encoding system.
Figure 6B:
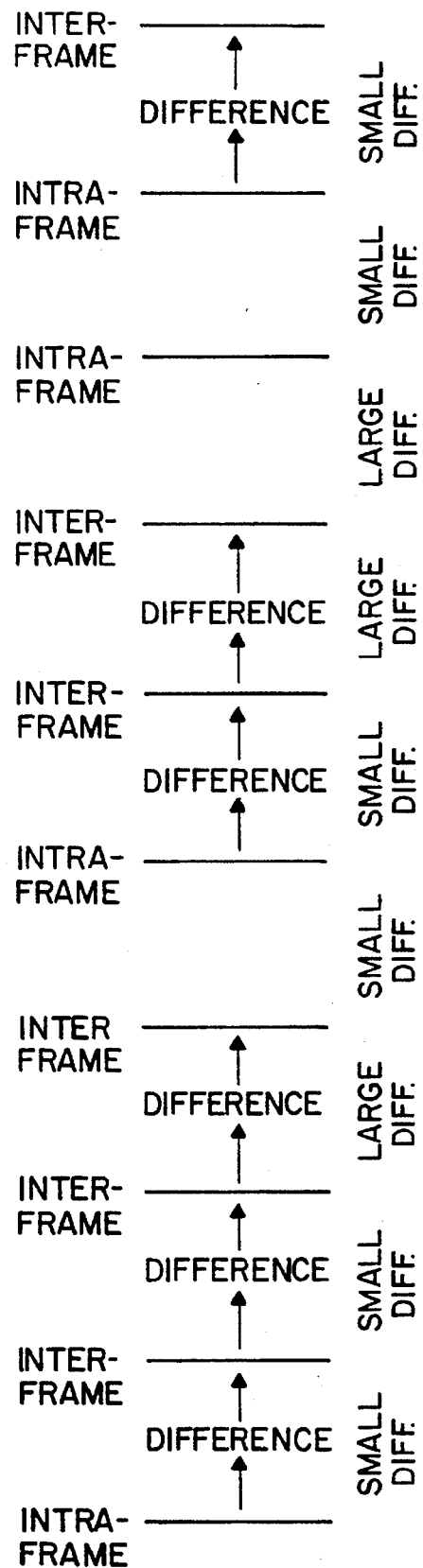

FIG. 6 shows the concept of the first principle, that is, the compulsory intra-frame encoding system. FIG. 7 indicates the prior art technology in which the difference between the present frame and the preceding frame are transmitted even though the difference is comparatively large unless an intra-frame encoding is selected from between the intra-frame encoding and the inter-frame encoding. Therefore, the time taken for reconstructing the deteriorated image quality caused by cell-discard is kept, at the until, an error converges to zero using a leak coefficient.

In the concept of the present invention shown in FIG. 6, an inter-frame coding is selected, for example. If the difference is comparatively large, a compulsory intra-frame-encoding is selected for the next frame. Therefore, the error in the next frame is immediately converged to zero even though data having a large difference are discarded.

Figure 7A:
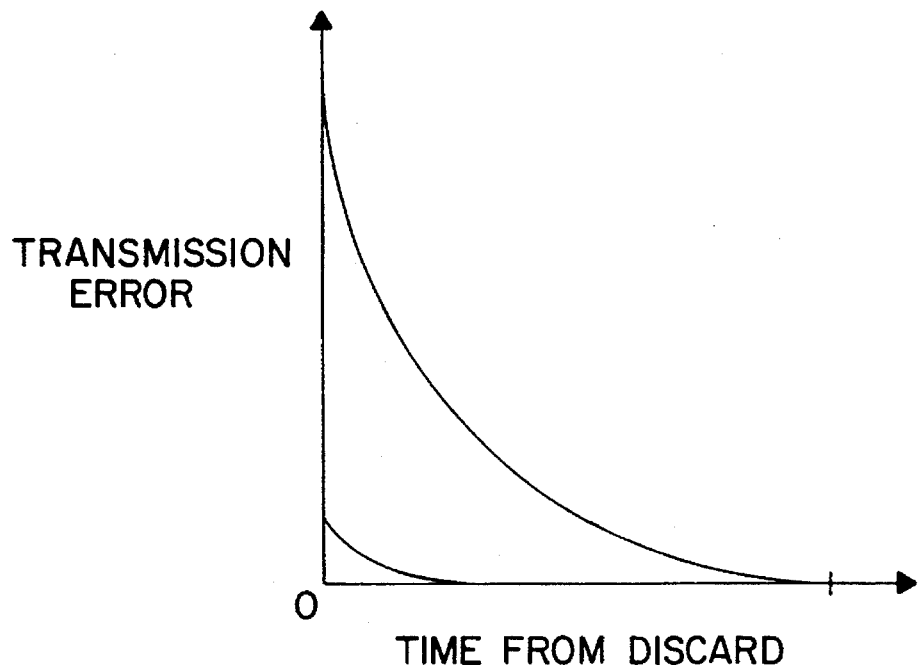
FIGS. 7A and 7B show an error in the compulsory inter-frame encoding system.
Figure 7B:
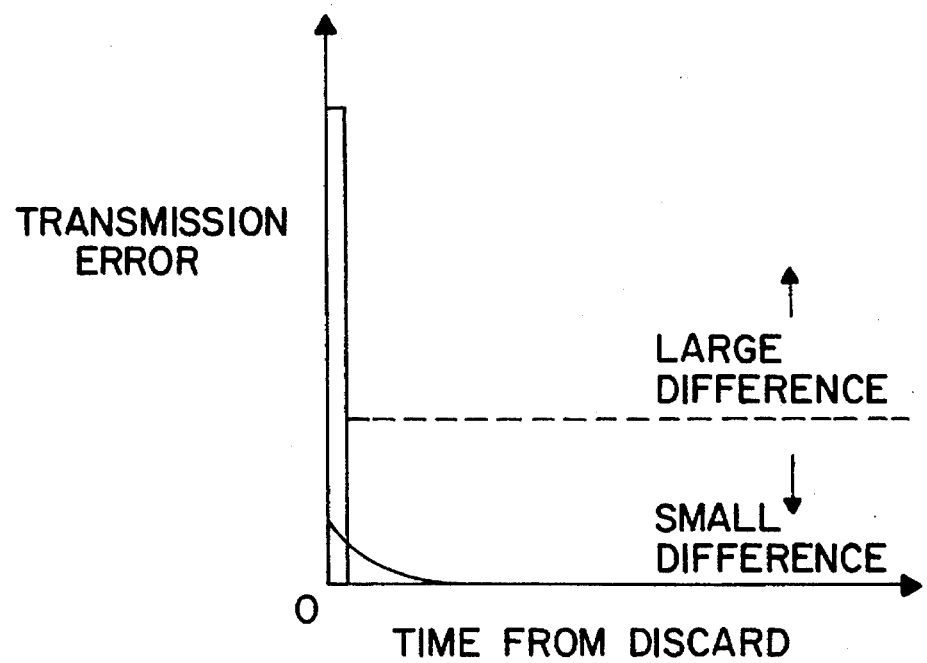

FIG. 7 is a view for explaining an error in the compulsory intra-frame encoding system. FIG. 7A indicates the prior art technology in which an error converges based on an almost equal time constant regardless of an error level. Inter-frame data having a large difference are discarded. When an error is very large, it takes a long time for it to converge to zero. By contrast, in the present invention shown in FIG. 7B, an error can converge in almost the same time as the conventional system if the difference is smaller than a predetermined threshold and a compulsory intra-frame encoding is not selected for the next frame. However, an error immediately converges to zero when the difference is larger than a predetermined threshold and a compulsory intra-frame encoding is selected for the next frame.

Figure 8:
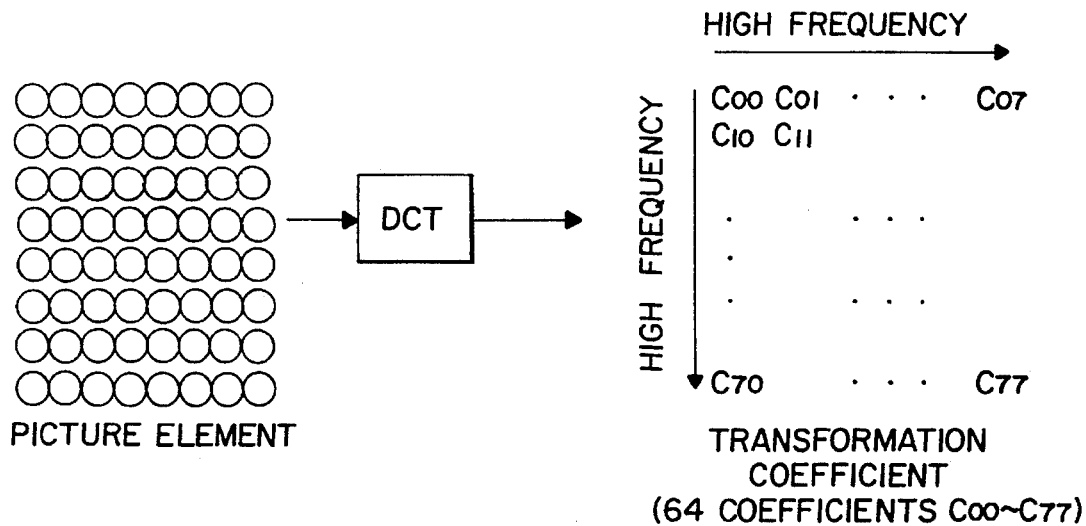
FIG. 8 shows how to convert picture element data to a frequency domain coefficients.

FIG. 8 shows a block diagram for explaining how to convert picture element data to a coefficient for a frequency domain by the discrete cosine transform. For example, a discrete cosine transform is performed on 8×8 picture element data to obtain 64 transformation coefficients for the frequency domain. The coefficients refer to the frequency component, and the coefficient Coo at the upper left corner generally indicates a direct current component. The coefficients toward right and downward therefrom show the higher frequency components.

Figure 9:
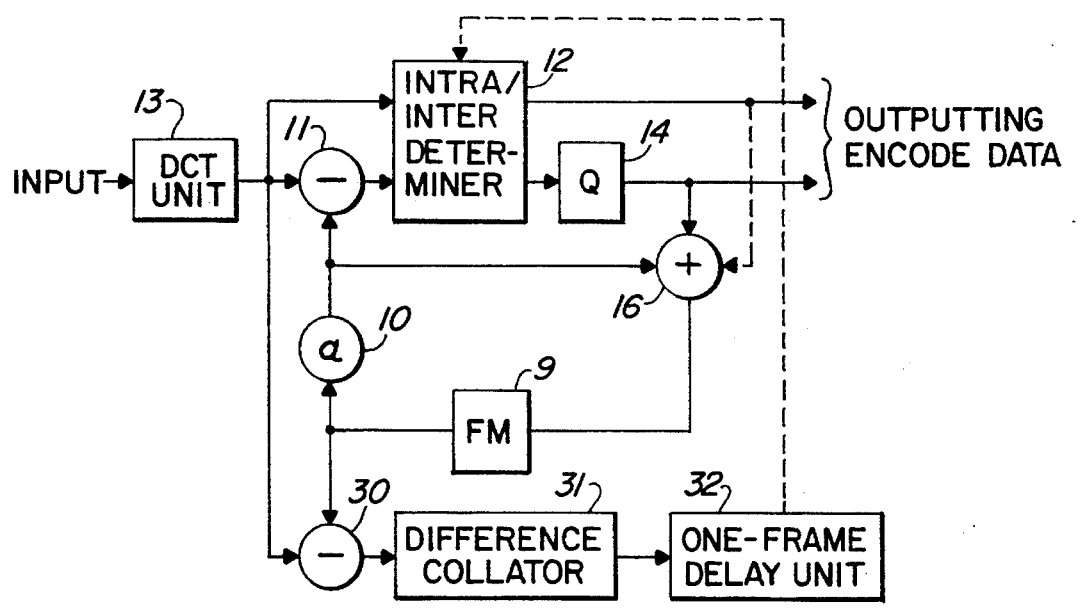
FIG. 9 is a block diagram for explaining the configuration of the first principle of the present invention.

FIG. 9 is a block diagram for explaining the configuration of the embodiment of the first principle. It shows the configuration on the sending side where a discrete cosine transform is performed on inputted data, and an intra-frame/inter-frame determination is made on the transformed data in the coefficient domain like in the second example of the encoding system of the prior art technology shown in FIG. 3. The same parts as those in FIG. 3 are assigned the same numbers.

Figure 3:
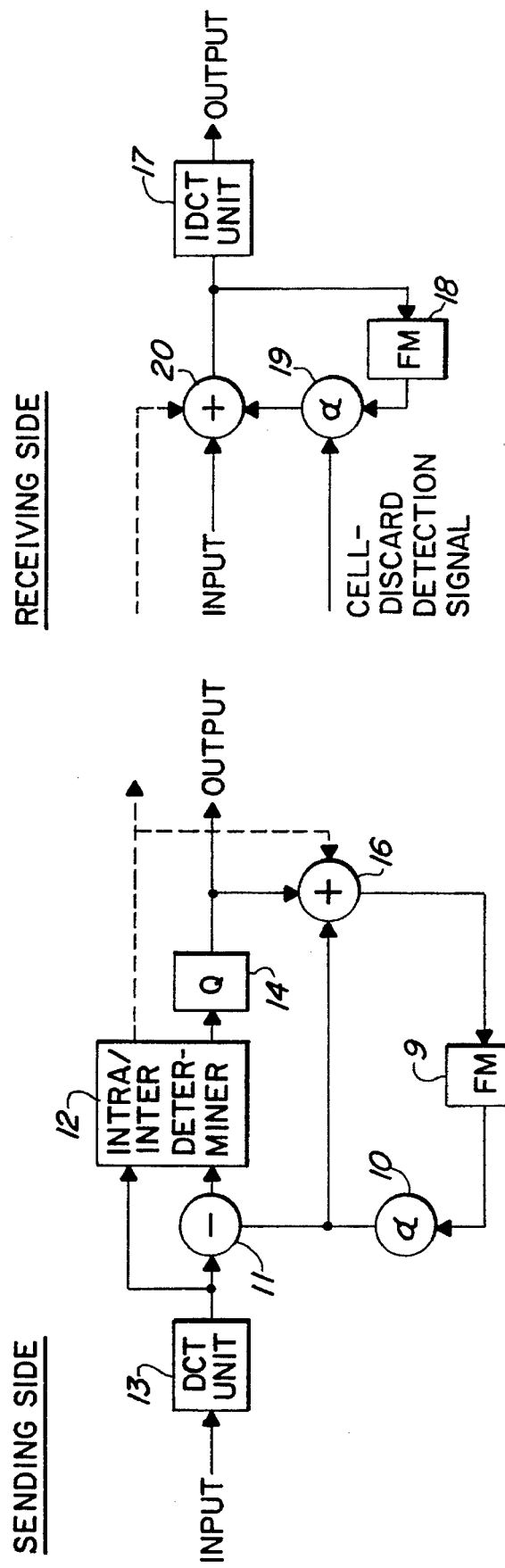
FIG. 3 is a block diagram for explaining the configuration of the second embodiment of the DCT inter-frame encoding system.
Figure 4:
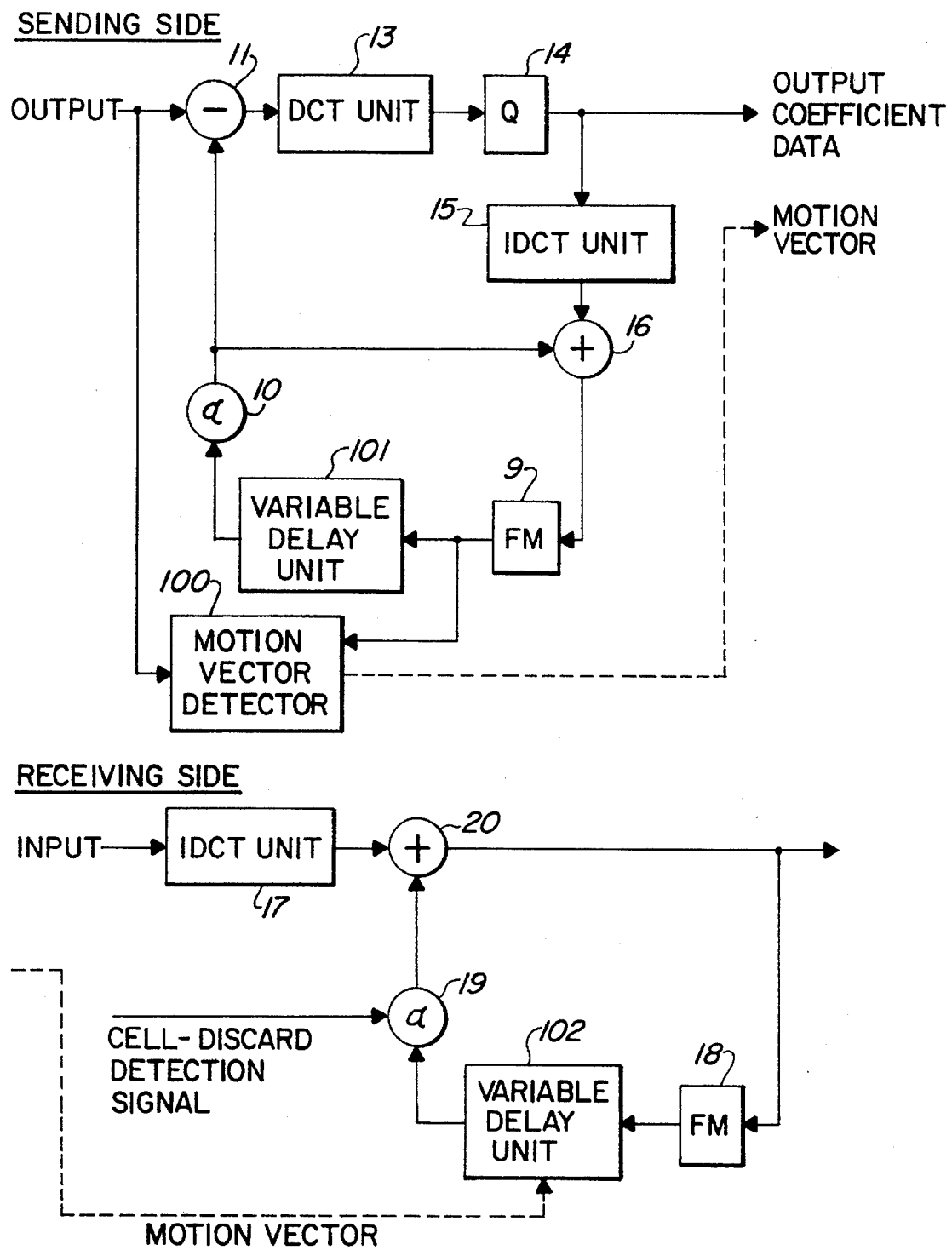
FIG. 4 is a block diagram for explaining the configuration of the motion compensation inter-frame DCT encoding system according to the third example of the prior art technology.

The configuration shown in FIG. 9 comprises, in addition to the configuration on the sending side shown in FIG. 3, a subtracter 30 for calculating the difference between the output of the DCT unit 13 and the output of the frame memory 9, that is, for calculating an inter-frame difference for all data in a block, a difference collator 31 for determining whether or not the difference is larger than a predetermined threshold, a one-frame delay unit 32 for delaying by one frame the output of the difference collator 31 and having the intra-frame/inter-frame determiner 12 select a compulsory intra-frame encoding for the next frame when the difference collator 31 determines that the difference is larger than the threshold.

Figure 10:
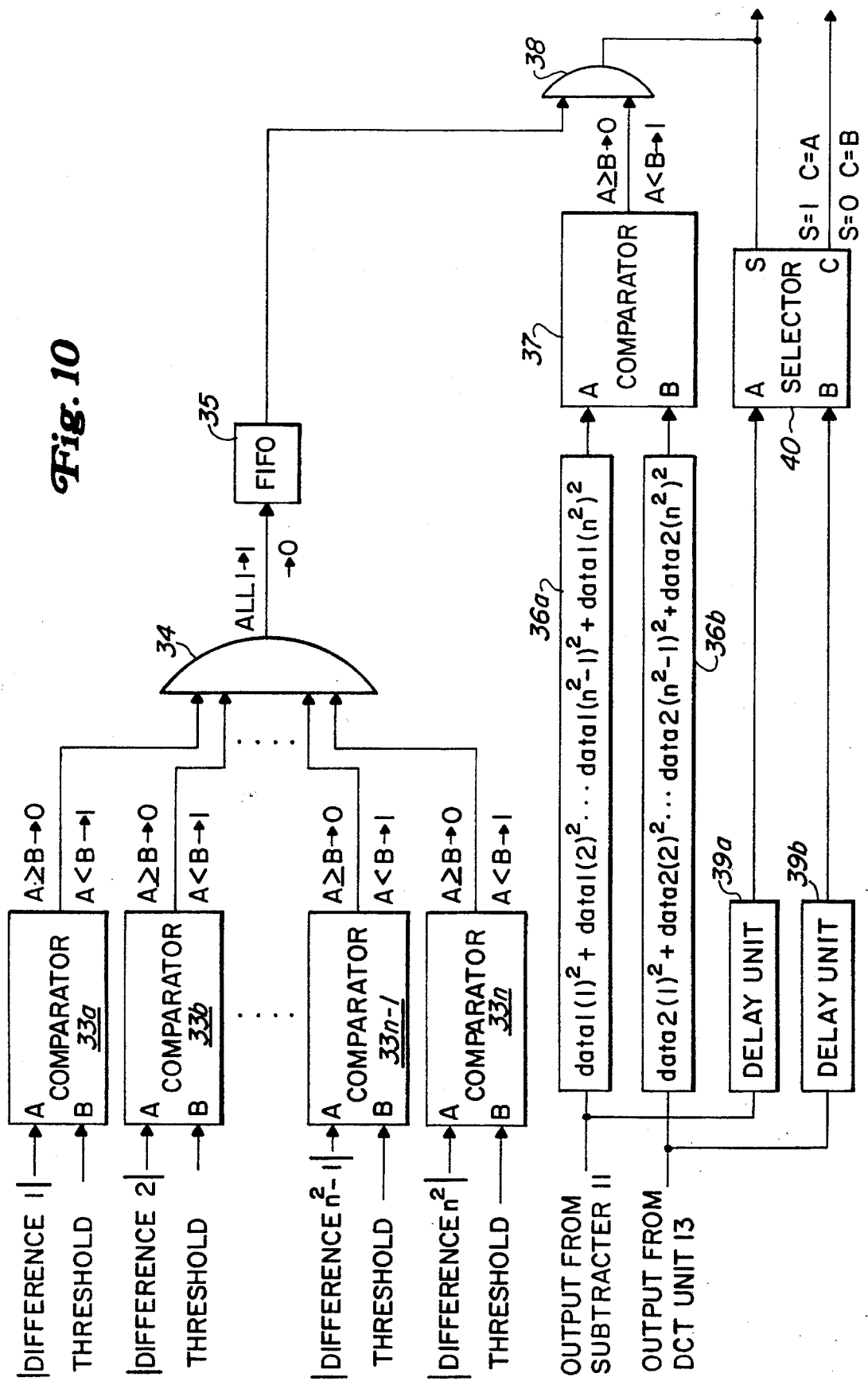
FIG. 10 shows the detailed configuration of the intra-frame/inter-frame determiner, the difference collator, and the one-frame delay unit shown in FIG. 9.

FIG. 10 is a detailed block diagram of the intra-frame/inter-frame determiner 12, the difference collator 31, and the one-frame delay unit 32 shown in FIG. 9. In FIG. 10, the difference collator 31 corresponds to comparators 33a–33n and an AND circuit 34, and the one-frame delay unit 32 corresponds to a first-in-first-out memory (FIFO) 35.

The number of comparators 33a–33n is equal to the number of the transformation coefficient data in a block. In each comparator, an inter-frame difference of block data is compared with a threshold. If the absolute value of the difference is larger than the threshold, "0" is outputted. If it is smaller than the threshold, "1" is outputted. If the inter-frame differences for all transformation coefficient data in a block are smaller than the threshold, the AND circuit 34 outputs "1". If any one absolute value of the difference in any data is larger than the threshold, it outputs "0", and the value is stored in the FIFO 35.

The intra-frame/inter-frame determiner 12 shown in FIG. 5 can be formed of a sum-of-squares calculator 36a for obtaining a sum of squares of data in transformation coefficient data in a block for the inter-frame difference data outputted by the subtracter shown in FIG. 9, a sum-of-squares calculator 36b for obtaining a sum of squares of data in transformation coefficient data in a block for the intra-frame data outputted by the DCT unit 13, a comparator 37 for comparing the outputs of two sum-of-squares calculators, an AND circuit 38, a delay unit 39a for delaying the output of the subtracter 11 by the time taken for intra-frame/inter-frame determination, a delay unit 39b for delaying the output of the DCT unit 13 by the above described time, and a selector 40 for outputting the output from either of two delay units, each being shown in FIG. 10.

In FIG. 10, the comparator.37 outputs "0" when a sum of squares of an inter-frame difference data is larger than a sum of squares of an intra-frame data, and outputs "1" when a sum of squares of an inter-frame difference data is smaller than a sum of squares of an intra-frame data. When the comparator 37 outputs "0", the AND circuit 38 outputs "0". At this time, the selector 40 outputs the output of the delay unit 39b, that is, intra-frame data, to the variable length encoder 3 shown in FIG. 22.

By contrast, an inter-frame encoding may be selected when the comparator 37 outputs "1". In this case, the FIFO 35 must also output "1". That is, the difference in all data in a block between the present and the previous frames must be smaller than a predetermined threshold. Then, the AND circuit 38 outputs "1", the selector 40 outputs the output from the delay unit 39a, that is, the inter-frame difference data outputted by the subtracter 11, to the variable length encoder 3. If the FIFO 35 outputs "0" while the comparator 37 outputs "1", that is, if the inter-frame difference at the same block position between the present and previous frames is larger than a predetermined threshold, the AND circuit 38 outputs "0", thereby selecting a compulsory intra-frame encoding.

Figures 11, 12:
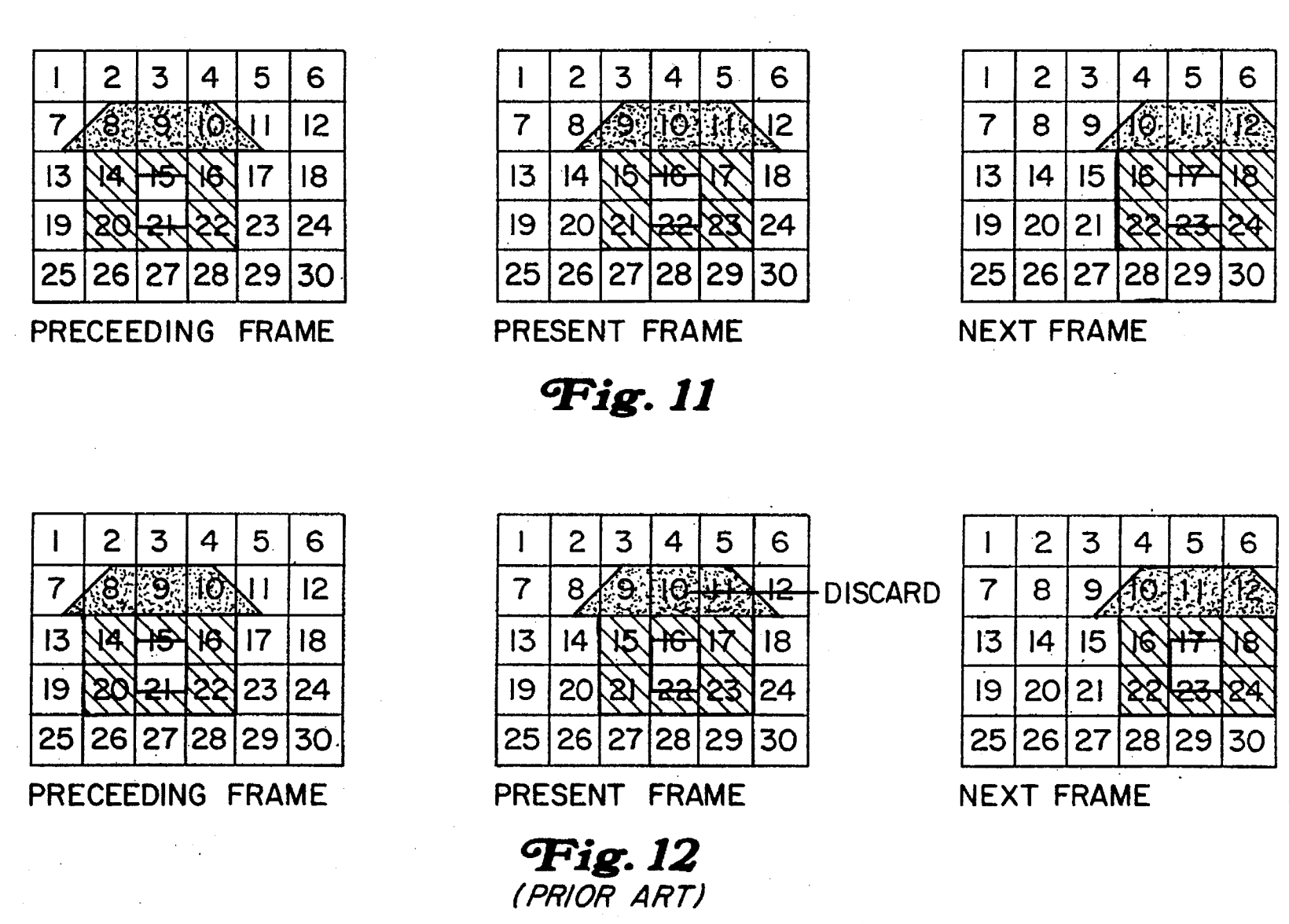
Figure 13:
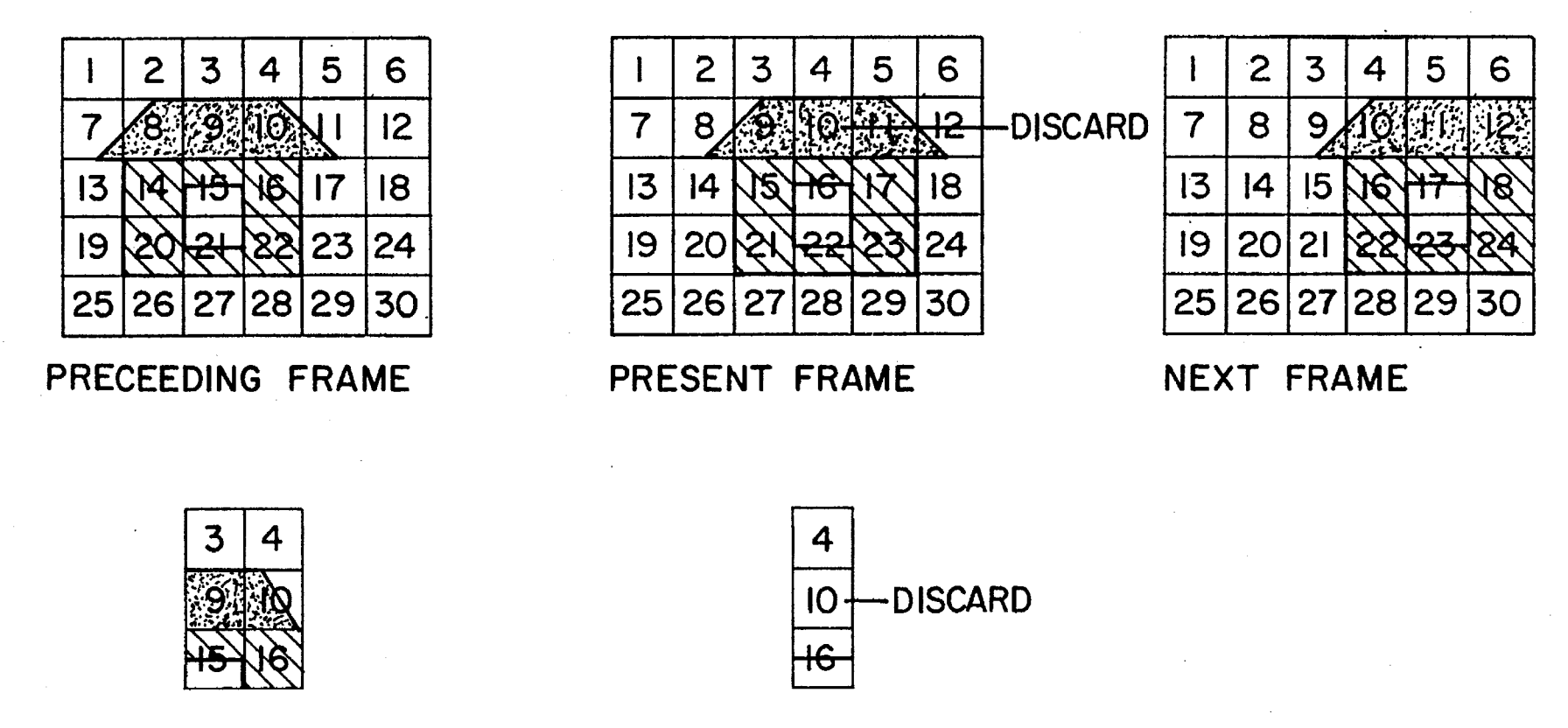

FIGS. 11–13 show the concept of the motion vector detecting system of the second principle of the present invention. FIG. 11 shows an example of a present frame, one frame before the present frame, and the next frame when no cell-discard has arisen, that is, transmission data are normally received. In this example, an image is positioned at the right, and a camera is moved to the left.

FIG. 12 shows an example of the conventional system in which data are replaced with block data in a preceding frame when cell-discard has arisen. In FIG. 12, if block 10 is discarded in the present frame, the missing data must be normally replaced with those in block 9 in the preceding frame. However, since the data in block 9 in the preceding frame is also discarded, the data is replaced with those in block 10 in the preceding frame "as is". In the next frame, the data in block 9 in the present frame, that is, the data with only its upper left corner lacking, are received unless additional cell-discard does not arise. However, the cell-discard affects block 10 in the present frame, thereby generating a block data with its upper right corner lacking.

FIG. 13 shows an example of replacement through a motion vector. Like in FIG. 12, the data in block 10 are assumed to be discarded in the present frame. As shown in the lower part of FIG. 13, if, for example, a motion vector is detected in block 4 above block 10 and in block 16 below block 10, and block 3 and 15 in the preceding frame are determined to move to block 4 and 16 respectively, then block 9 is assumed to move to block 10. Thus, as shown in FIG. 15, the influence of the cell-discard in block 10 can be eliminated by replacing the data in block 10 in the preceding frame with those in block 9.

Figure 14:
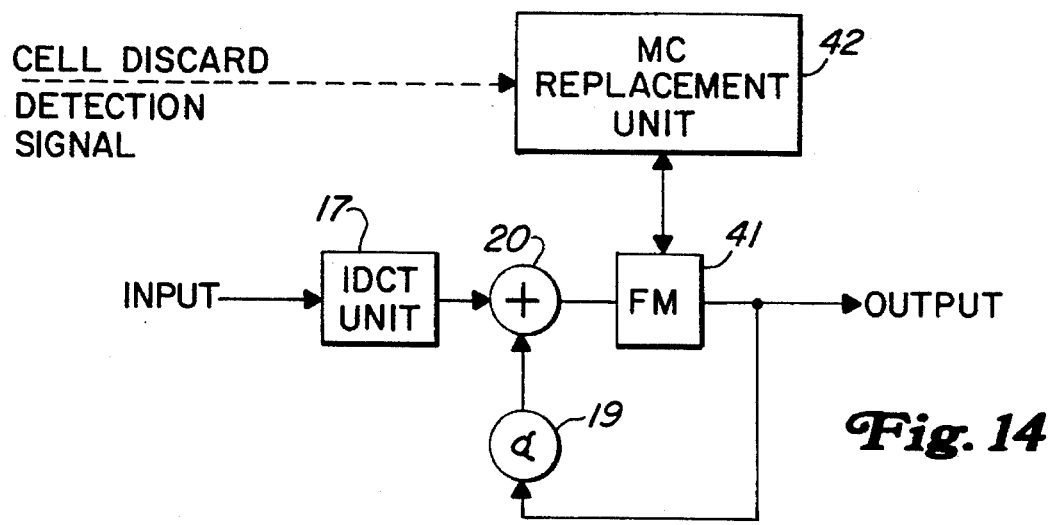
FIG. 14 is the block diagram for explaining the configuration of an embodiment of the second principle.
Figure 16:
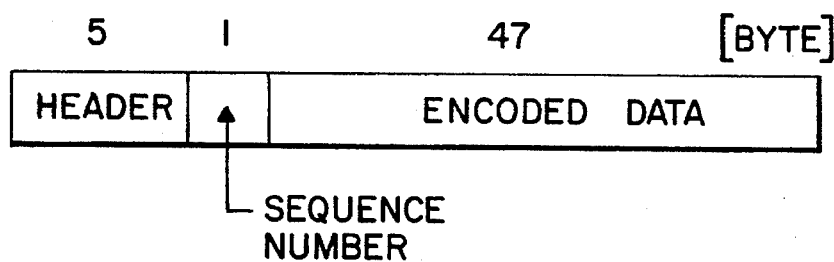
FIG. 16 shows an embodiment of a cell format.

FIG. 14 is a block diagram for explaining the configuration of an embodiment of the second principle. It shows the configuration on the receiving side for performing by the IDCT unit 17 an inverse orthogonal transform on received input data and then decoding them like in the first example of the prior art technology shown in FIG. 2. In FIG. 14, like the frame memory 18 shown in FIG. 2, a frame memory 41 is used in a common decoding process, and also used for replacing discarded block data using a motion vector. A motion compensation replacement unit 42 for replacing discarded block data using a motion vector detects a motion vector using block data surrounding the discarded block data when a cell-discard detection signal is inputted by the cell disassembler 5 and replaces the discarded block data. Detection of a motion vector and replacement of block data are described later.

Figure 15:
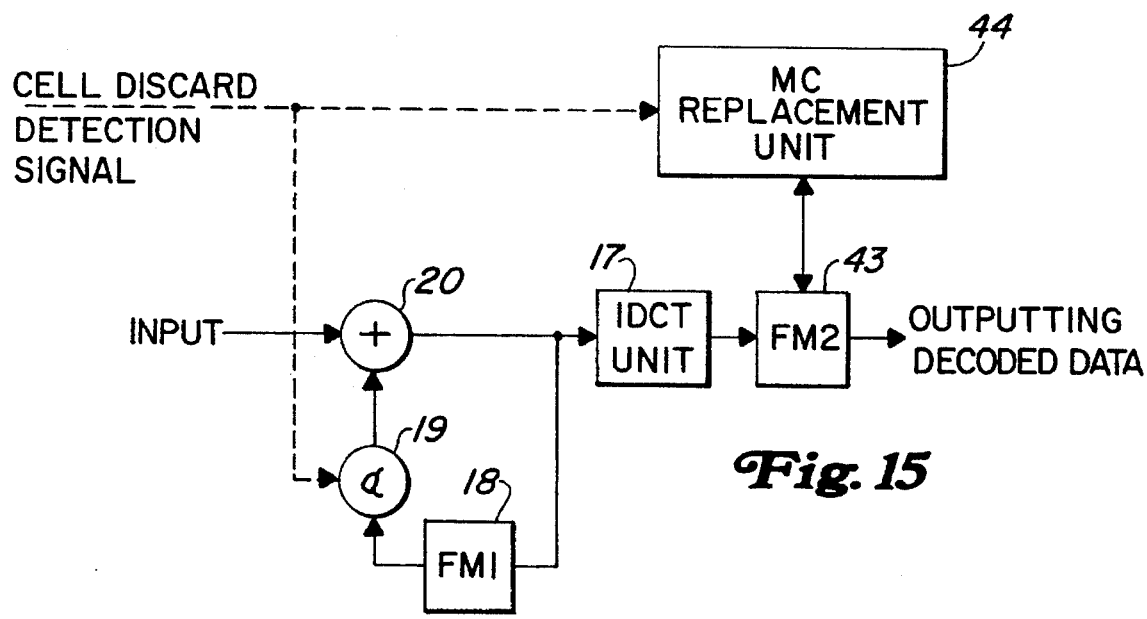
FIG. 15 is a block diagram for explaining the configuration of other embodiments of the second principle.

FIG. 15 is a block diagram for explaining the configuration of another embodiment of the second principle of the present invention. It corresponds to the second prior art technology shown in FIG. 3. The frame memory 18 stores the data in the coefficient domains. A motion vector cannot be detected in these data. Therefore, the IDCT unit 17 stores the data converted to the picture element domain in a second frame memory 43. When cell-discard is detected, an MC replacement unit 44 replaces discarded block data with the block data stored in the second frame memory 43. When cell-discard is detected, a detection signal is applied to the leak coefficient unit 19. The data stored in the frame memory 18 are not processed with a leak coefficient, but stored again in the frame memory 18. Simultaneously, they are transformed to the data in the picture element domain by the IDCT unit 17, and then outputted to the second frame memory 43.

Figure 2:
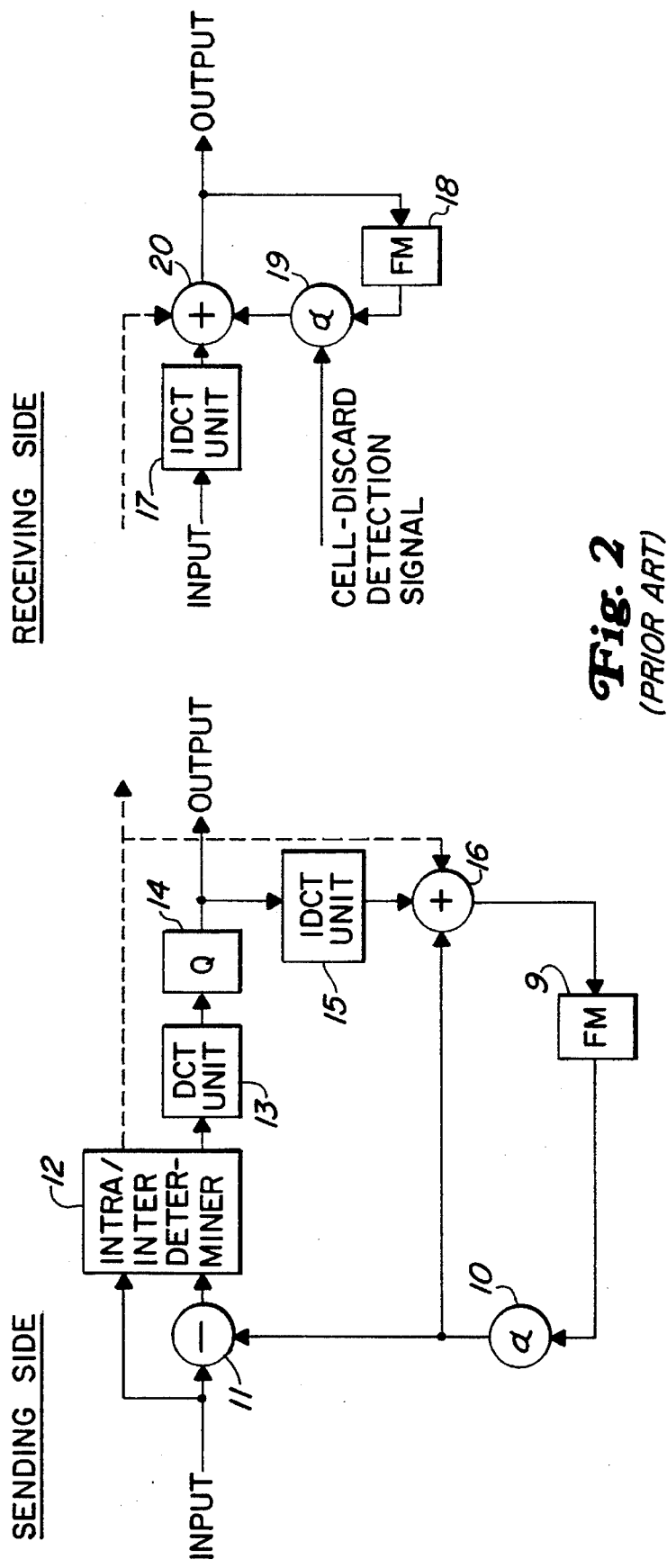
FIG. 2 is a block diagram for explaining the configuration of the first embodiment of the inter-frame DCT encoding system.

In the embodiment of the second principle of the present invention, the operation when an intra-frame encoding is selected on the sending side is the same as the conventional operation shown in FIGS. 2 and 3.

Figure 22:
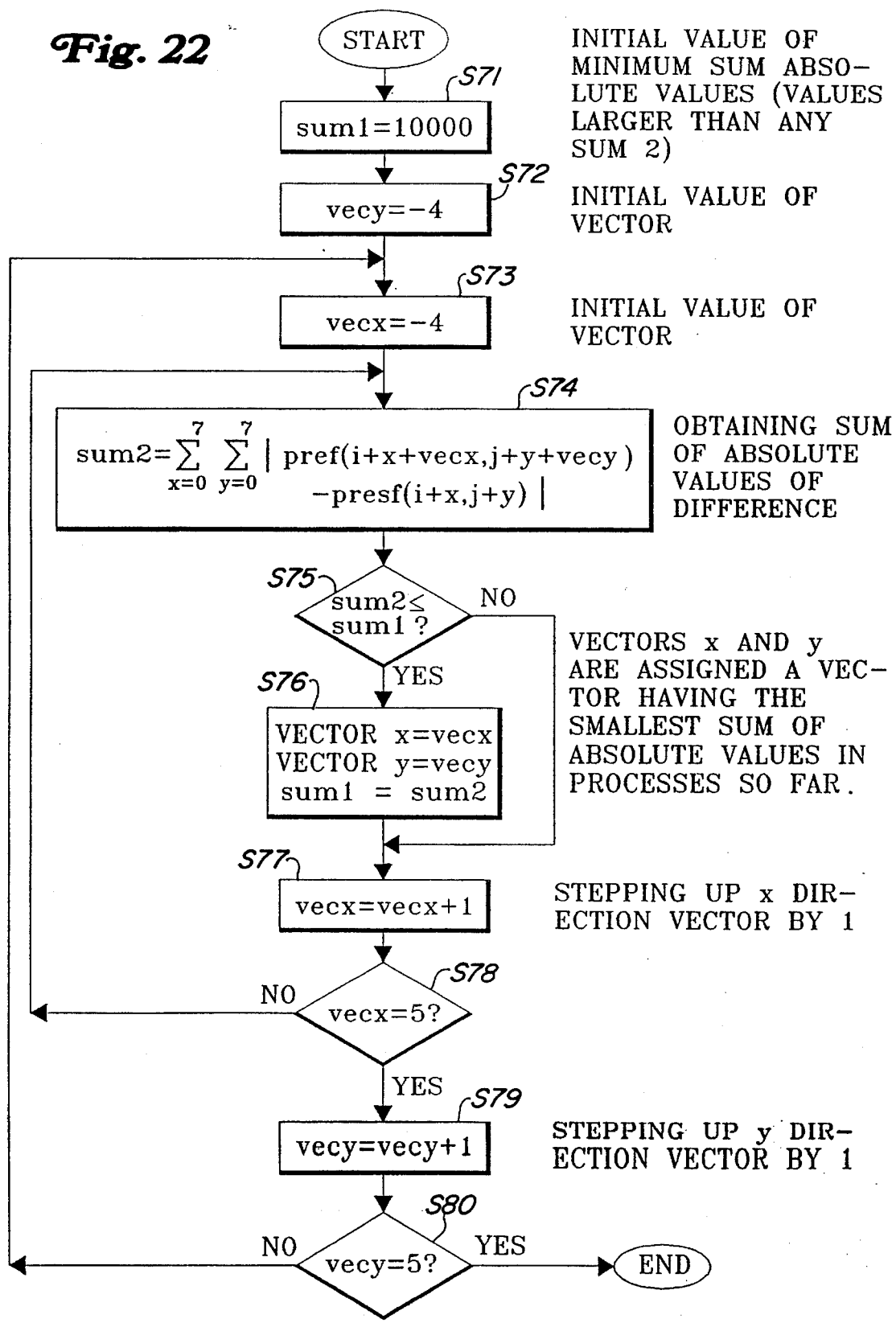
FIG. 22 is a detailed flowchart of a motion vector detecting process shown in FIG. 21.

Next, a cell-discard detecting system in the second principle of the present invention is described below. FIG. 22 shows an embodiment of a cell format. In FIG. 22, a 5-byte header is stored before the 53-byte cell, followed by a 1-byte sequence number as side information. Cell-discard can be detected by monitoring a sequence number. The encoded data in a cell occupy 47 bytes.

Figure 1:
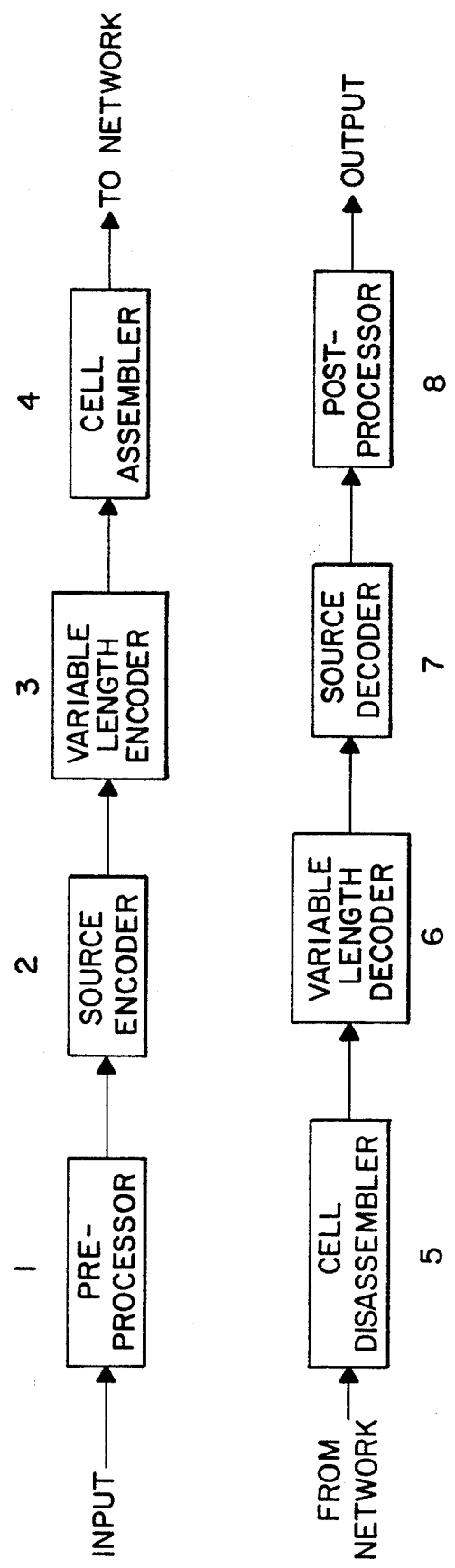
FIG. 1 is a block diagram for explaining the general configuration of an image transmission system.
Figure 17:
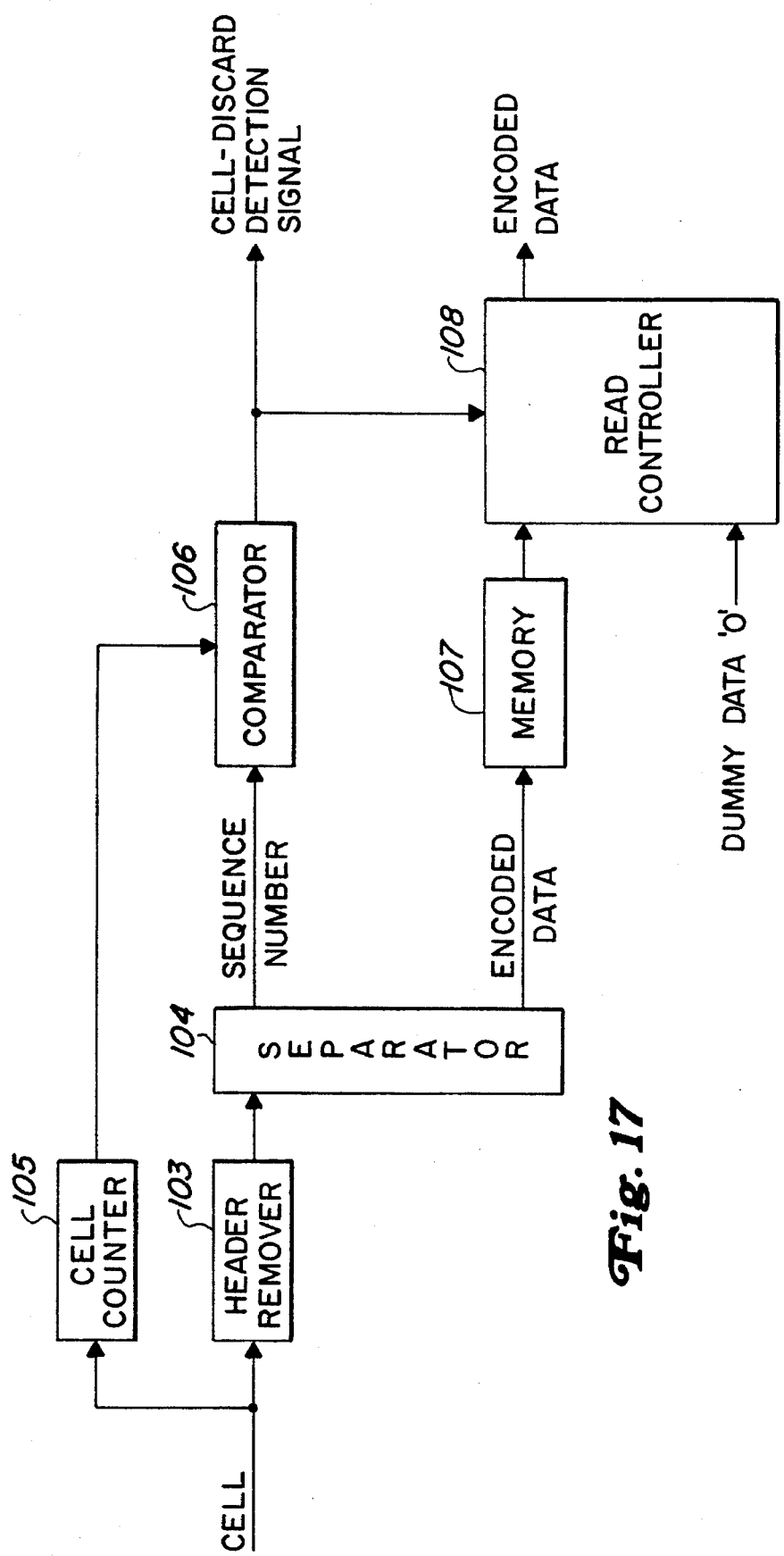
FIG. 17 is a block diagram for explaining the configuration of the cell disassembler.
Figure 23:
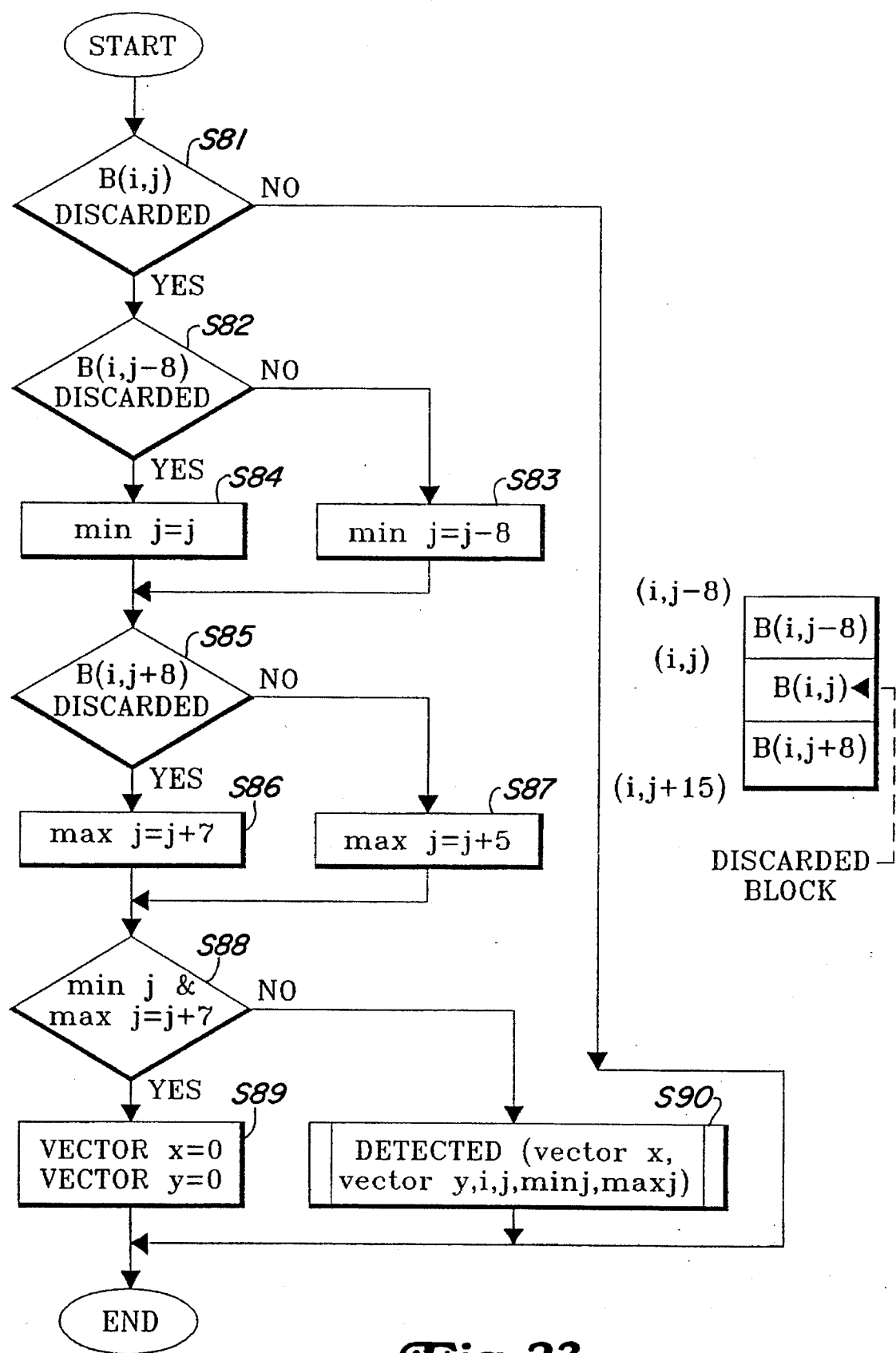
FIG. 23 is a flowchart of an embodiment of the second motion vector detecting process.

FIG. 17 is a configurational block diagram of the cell disassembler 5. In FIG. 23, the header is removed from the received cell by a header removing unit 103. The cell whose header is removed is applied to a disassembler 104, and is divided to a 1-byte sequence number and 47-byte encoded data. The value in a cell counter 105 is stepped up when a cell is received. The counter value and the sequence number outputted from the disassembler 104 are compared by a comparator 106, and a cell-discard detection signal is outputted when a sequence number is omitted. The 47-byte encoded data from the disassembler 104 is provided for the variable length decoder 6 shown in FIG. 1 as encoded data by a read controller 108 through a memory 107. When cell-discard is detected, "0", for example, are outputted for 47 bytes as dummy data.

Figure 18:
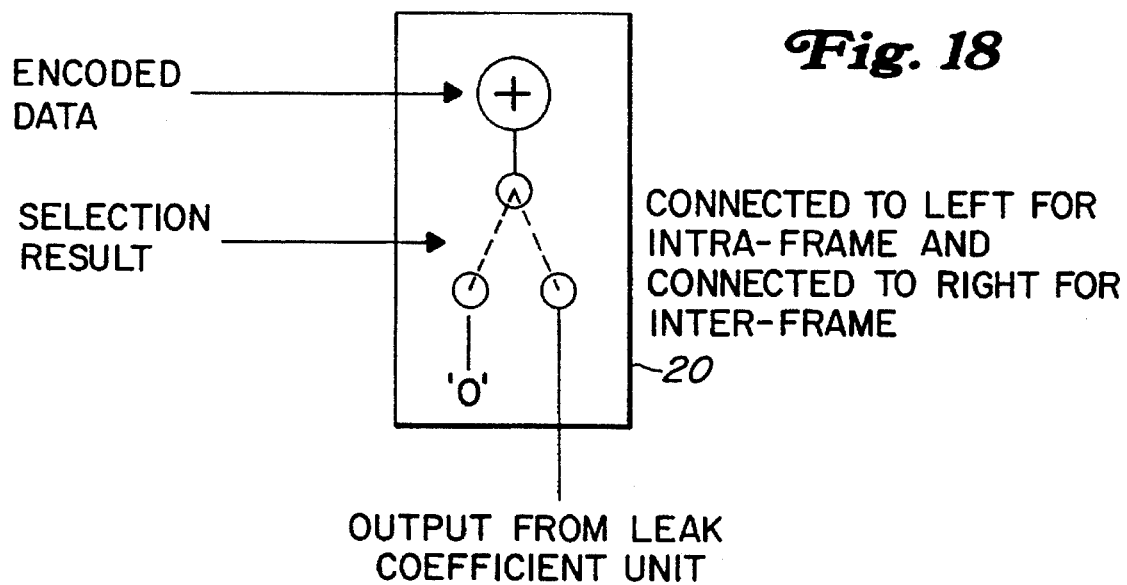
FIG. 18 is a block diagram for explaining the configuration of the adder.

FIG. 18 is a configurational block diagram of the adder 20 shown in FIGS. 14 and 15. When an intra-frame encoding is selected, inputted data and the encoded data from a read controller 108 shown in FIG. 17 and "0" are added together and outputted. When an inter-frame encoding is selected, an output from the leak coefficient unit 19 and the encoded data are added together and outputted.

Figure 19:
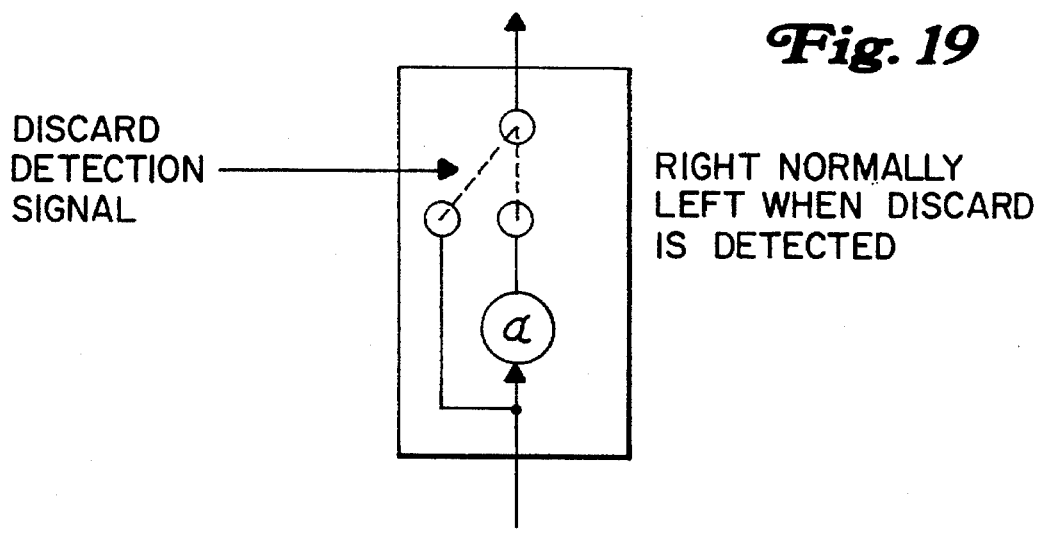
FIG. 19 is a block diagram for explaining the configuration of the leak coefficient unit.
Figure 21:
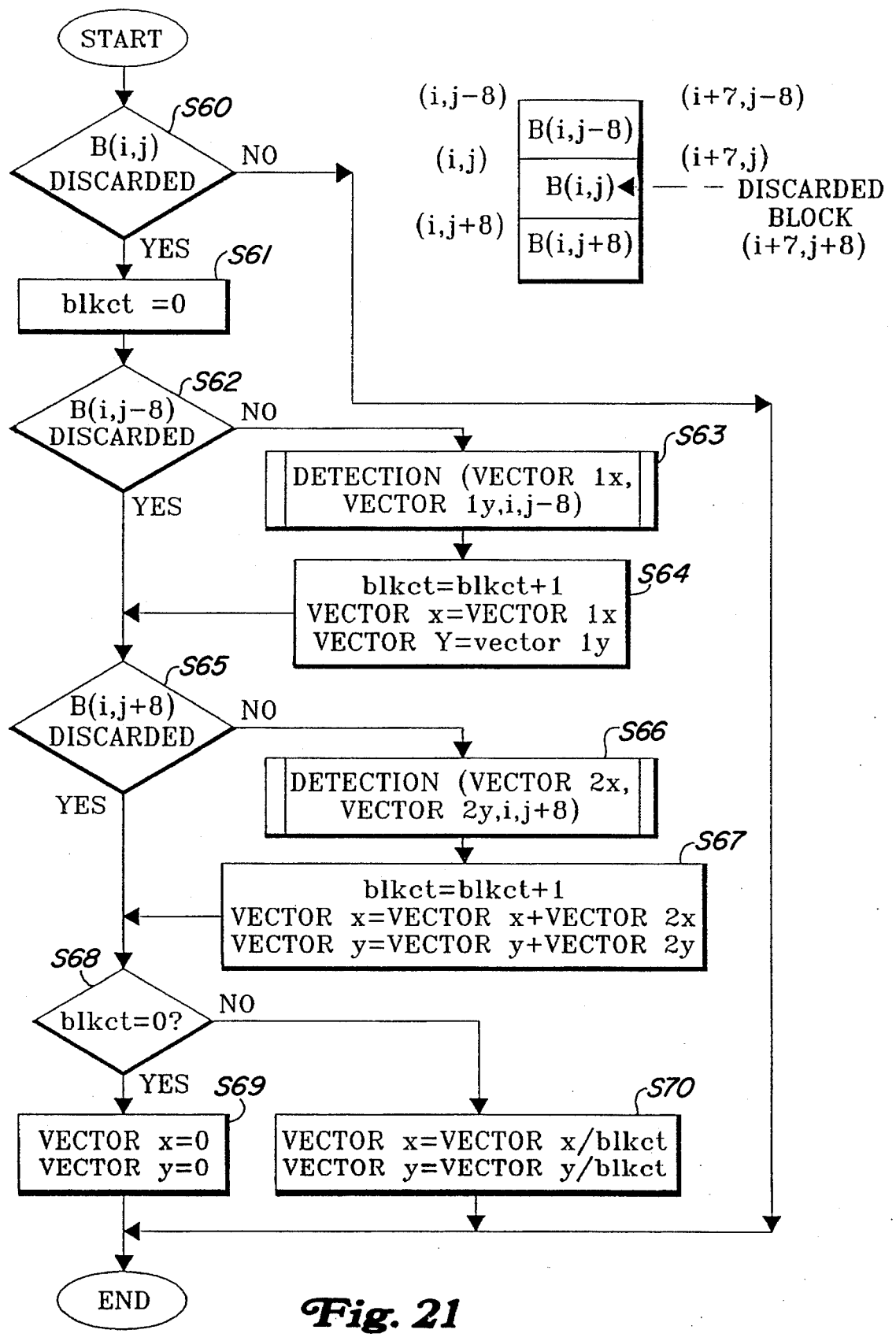
FIG. 21 is a flowchart of an embodiment of the first motion vector detecting process.

FIG. 19 is a configurational block diagram of the leak coefficient unit 19. For example, when cell-discard is detected as shown in FIG. 21, dummy data "0" are applied from the cell disassembler. At this time, the data in the preceding frame stored in the frame memory 18 are outputted as is to the adder 20 without performing a multiplication by the leak coefficient. When cell-discard is not detected, the content in the frame memory 18 is multiplied by the leak coefficient, and the result is outputted.

FIG. 20 is a flowchart of an embodiment of a data replacement process using a motion vector. FIG. 20 includes the following abbreviations:

i, j: BLOCK ADDRESS x, y : VARIABLE vector x, vector y: vector of B(i,j)

presf (i,j): ADDRESS (i,j) DATA OF PRESENT FRAME prevf (i,j): ADDRESS (i,j) DATA OF PRECEDING FRAME.

In FIG. 20, when the process starts, determination is made in step S 51 as to whether or not block B(i,j) has been discarded. In block B(i,j), the coordinates of the point at the upper left corner are (i,j) as shown toward the right-hand side of FIG. 20. One block comprises 8×8 picture elements.

In step S 52, the difference y of the coordinates in the vertical direction (e.g. downward) from the upper left corner point (i,j) of a block is set to "0". In step S 53, the difference x of the coordinates in the horizontal direction (e.g. to the right) is set to "0". In step S 54, the data for the coordinates (i+x,j+y) in the present frame can be calculated by the following expression using the motion vectors x and y.

$$presf(i+x,j+y)=prevf(i+x+\text{vector }x,j+y+\text{vector }y)$$

where "presf" indicates the present frame, and "prevf" indicates the preceding frame.

Then, in step S 55, the value of x is stepped up. In step S 56, determination is made as to whether or not x equals 8. If not, the processes are repeated from step S 54.

If x equals 8 as the result of the determination in step S 56, the difference of the coordinates in the horizontal direction, that is, the horizontal replacement range by a motion vector, has reached the width of one block. Accordingly, in step S 57, the value of y is stepped up. In step S 58, determination is made as to whether or not the value of y has reached 8. If not, the processes are repeated from step S 53. In step S 58, if y has reached 8, the process is terminated. If block B(i,j) is not determined to have been discarded in step S 51, the process is terminated immediately.

FIG. 21 is a flowchart for explaining the first embodiment of an average value calculation process of a motion vector for one or more blocks in the motion vector general detection process. FIG. 21 includes the following abbreviations:

i, j: BLOCK ADDRESS vector x, vector y: vector of B(i,j)

vector 1x, vector 1y: vector of B(i,j−8)

vector 2x, vector 2y: vector of B(i,j+8) blkct: NUMBER OF SIGNIFICANT BLOCKS.

In the flowchart shown in FIG. 21, when the process starts, a determination is made in step S 60 as to whether or not block B(i,j) has been discarded. If not, the process is terminated immediately.

When block B(i,j) is determined to have been discarded, the number of significant blocks, that is, the number of significant blocks blkct used for detecting a motion vector is set to "0" in step S 61. In step S 62, a determination is made as to whether or not block B(i,j−8) has been discarded. As shown toward the right-hand side of FIG. 21, block B(i,j−8) is positioned above block B(i,j) which is detected as being discarded.

If the block above (shown toward the right-hand side of FIG. 21) is not discarded in step S 62, a motion vector is detected using the block above in step S 63. In step S 64, the number of significant blocks blkct is stepped up and the vectors x and y are obtained. Then, control is transferred to step S 65. If the block above is detected as being discarded in step S 62, it is impossible to detect a motion vector. Therefore, control is transferred to the process in step S 65 without performing the processes in steps S 63 and S 64.

In step S 65, determination is made as to whether or not the block below the discarded block B(i,j) shown toward the right-hand side of FIG. 21 has been discarded. If not, a motion vector is detected using the block below in step S 66 like it is detected using the block above in step S 63. In step S 67, the value of blkck is stepped up, and the motion vectors x and y are obtained using the vector obtained in step S 66 and the motion vectors x and y obtained in step S 64. If the block above is discarded and the process in step S 64 is not performed, the motion vectors x and y obtained in step S 67 equal the motion vectors detected in step S 66. If cell-discard is detected in step S 65, control is transferred to the process in step S 68 without performing the processes in steps S 66 and S 67.

In step S 68, determination is made as to whether or not the number of significant blocks equals "0". If yes, both the blocks above and below are discarded. In this case, since a motion vector cannot be obtained, the process is terminated with the motion vectors x and y set to "0" in step S 69. If the number of significant blocks does not equal "0", the values of the motion vectors x and y already obtained in step S 70 divided by the number of significant blocks respectively are assigned as the final values of the vectors x and y, and the process is terminated.

FIG. 22 is a detailed flowchart of a motion vector detecting process shown in FIG. 21. FIG. 22 includes the following abbreviations:

i, j: ABSOLUTE COORDINATES OF UPPER LEFT CORNER POINT OF DETECTED BLOCK vector x, vector y: VECTOR WITH MINIMUM SUM OF ABSOLUTE VALUES vecx, vecy: VECTOR x, y RELATIVE COORDINATE TO UPPER LEFT CORNER POINT OF DETECTED BLOCK sum 1: MINIMUM SUM OF ABSOLUTES sum 2: SUM OF ABSOLUTE VALUES presf (i,j): ADDRESS (i,j) DATA OF PRESENT FRAME prevf (i,j): ADDRESS (i,j) DATA OF PRECEDING FRAME.

It is used in detecting a motion vector for a block above described in step S 63 in FIG. 21 and used in detecting a motion vector for a block below described in step S 66.

In FIG. 22, when the process is started, in step S 71, the value of sum 1 is set to 10,000 as the minimum initial value of the sum of absolute values described later. In step S 72, the value of the vertically-variable vector "vecy" is set to −4. In step S 73, the value of the horizontally-variable vector "vecx" is set to −4. In step S 74, using the variable vectors set in steps S 72 and S 73, a difference is calculated between the data of a point obtained by adding a variable vector to the coordinates of any point in the preceding frame, and the data of the point at the same position as the above described "any point" in the present frame. The sum of the absolute values sum 2 of the differences described above are calculated for all the points in the block. In step S 75, determination is made as to whether or not the grand total of the calculation performed in step S 75 is smaller than the initial value set in step S 71.

If the sum is smaller than the initial value in step S 75, variable vectors are assigned as motion vectors in step S 76. In step S 74, the obtained sum of absolute values sum 2 is determined to be the minimum value sum 1 of the sum of absolute values, and control is transferred to step S 77. If the sum is not smaller than the initial value in step S 75, the variable vector is not determined to be close to the motion vector. Therefore, control is transferred to the process in step S 77 without performing the process in step S 76.

In step S 77, the value of the horizontally-variable vector is stepped up. In step S 78, determination is made as to whether or not the value of the horizontally-variable vector has reached 5. If not, data have not been checked up to the half of the width of the block. The processes are repeated from the process in step S 74. If the value of the horizontally-variable vector has reached 5 in step S 78, the value of the vertically-variable vector is stepped up. In step S 80, determination is made as to whether or not the value has reached 5. If not, the processes are repeated from the process in step S 73. If yes, the process is terminated immediately.

FIG. 23 is a flowchart for explaining the second embodiment of the motion vector general detecting process. FIG. 23 includes the following abbreviations:

i, j: BLOCK ADDRESS vector x, vector y: VECTOR OF b(i,j)

i, min j: ADDRESS OF UPPER LEFT CORNER POINT OF GROUP i+7, max j: ADDRESS OF UNDER RIGHT CORNER POINT OF GROUP.

In the second embodiment, unlike the first embodiment described by referring to FIG. 21, the blocks above and below a discarded block are regarded as one group. Among them, one motion vector is detected.

In the flowchart shown in FIG. 23, when the process is started, determination is made in step S 81 as to whether or not B(i,j) has been discarded. If not, the process is terminated immediately. If it has been discarded, determination is made in step S 82 whether or not block B(i,j−8), that is, the block above (refer to the right hand side of FIG. 23), is discarded. If not, the vertical coordinate mini at the upper limit within the motion vector detection range is set to j−8 in step S 83. If yes, the value is set to j in step S 84 and control is transferred to the process in step S 85.

In step S 85, determination is made as to whether or not block B(i,j+8), that is, the block below has been discarded. If yes, the vertical coordinate maxj at the lower limit within the motion vector detection range is set to j+7 in step S 86. If not, the value is set to j+15 in step S 87, and control is transferred to the process in step S 88.

In step S 88, determination is made as to whether or not the minimum value mini of the vertical coordinate within the detection range is equal to j, and the vertical coordinate maxj at the lower limit within the range is equal to j+7. If yes, both the blocks above and below has been discarded. Therefore, a motion vector cannot be detected, and the process is terminated with these values set to "0" in step S 89. If even one of the above described minj and maxj is different from the indicated value, a motion vector is detected in step S 90 with blocks having no cell-discard between the maximum and minimum values of the vertical coordinate established as one group, and then the process is terminated.

Figure 24:
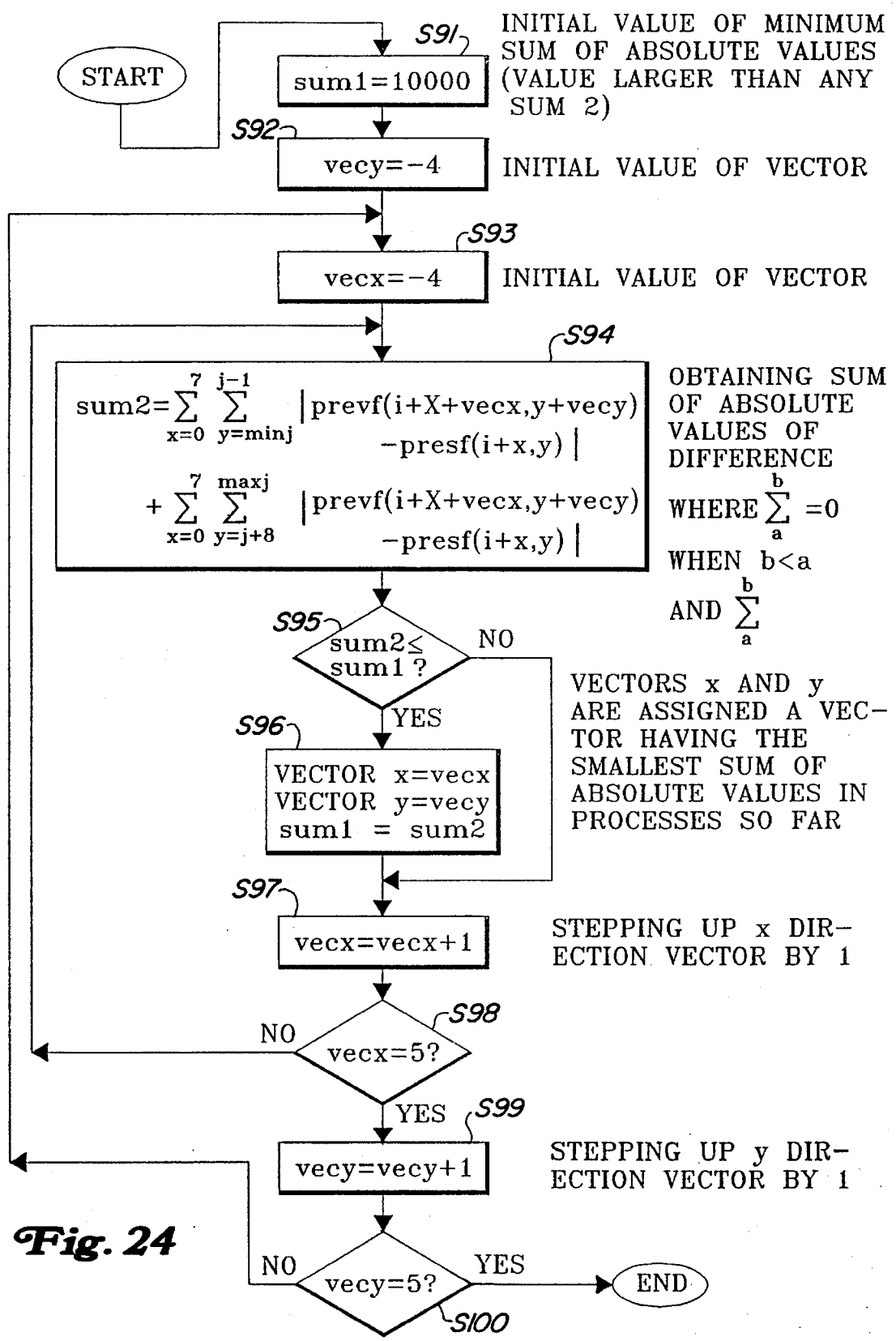
FIG. 24 is a detailed flowchart of a motion vector detecting process shown in FIG. 23.

FIG. 24 is a detailed flowchart for explaining the motion vector detecting process shown in FIG. 23. FIG. 24 includes the following abbreviations:

i, j: ABSOLUTE COORDINATES OF UPPER LEFT CORNER POINT OF DETECTED BLOCK vector x, vector y: VECTOR WITH MINIMUM SUM OF ABSOLUTE VALUES vecx, vecy: VECTOR x, y: RELATIVE COORDINATE TO UPPER LEFT CORNER POINT OF DETECTED BLOCK sum 1: MINIMUM SUM OF ABSOLUTES sum 2: SUM OF ABSOLUTE VALUES presf (i,j): ADDRESS (i,j) DATA OF PRESENT FRAME prevf (i,j): ADDRESS (i,j) DATA OF PRECEDING FRAME.

The flowchart is similar to that shown in FIG. 22 except in the domain in which a sum of absolute values of differences is obtained in step S 94 and in the expression which is different from that in S 74 shown in FIG. 22. The first paragraph of the object in a block S 94 corresponds to the sum of absolute values of the differences for the blocks above. The second paragraph corresponds to the sum of absolute values of the differences for the blocks below. With these paragraphs, if an upper limit is smaller than a lower limit in a vertical coordinate y, the total sum in the paragraph equals "0".

Figure 25:
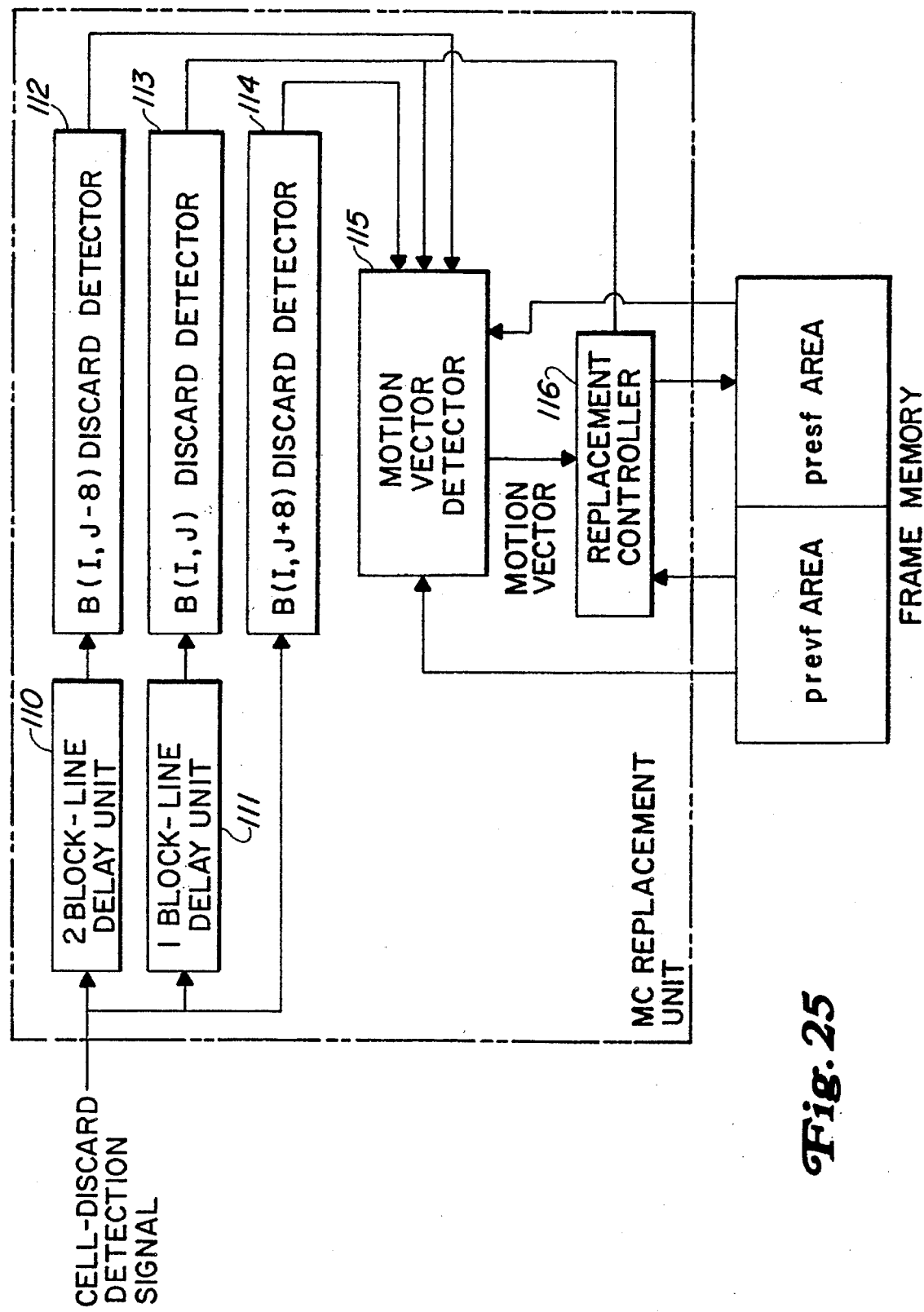
FIG. 25 is a block diagram for explaining the configuration of the MC replacement unit shown in FIGS. 14 and 15.

FIG. 25 is a configurational block diagram of the MC replacement unit shown in FIGS. 14 and 15. The embodiment shown in FIGS. 21 and 22 are different from that shown in FIGS. 23 and 24 in the motion vector detecting system. However, they have a similar configuration of the MC replacement unit.

As described in the above described flowchart, data in the blocks above and below must be received in processing a target replacement block. Thus, as shown in FIG. 25, a B(i,j−8) discard detector 112 detects the discard of a block above the target block according to a 2-block line delay unit 110, a B(i,j) discard detector 113 detects the discard of the target block according to a 1-block line delay unit 111, and a B(i,j+8) discard detector 114 detects the discard of a block below the target block. A motion vector 115 detects a motion vector according to the outputs from these 3 discard detectors 112–114 and the content of the frame memory. Using the detected motion vector, a replacement controller 116 reads data in the prevf domain in the frame memory for storing data in the preceding frame, and replaces the discarded data with them by writing the replacement data into the presf domain.

Figure 26:
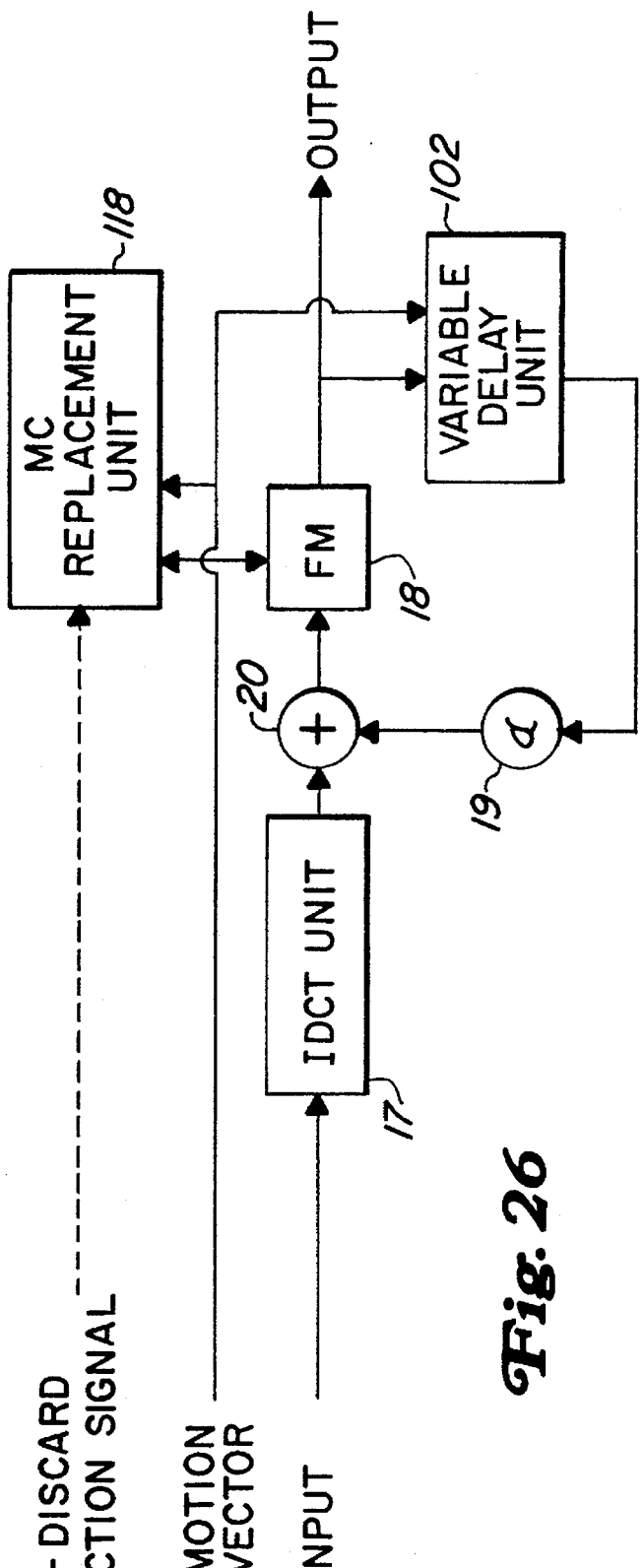
FIG. 26 is a block diagram for explaining the configuration of the embodiment to which a part of the second principle is applied.

FIG. 26 is a configurational block diagram for explaining the embodiment to which a part of the second principle is applied. FIG. 26 corresponds to the third example of the prior art technology shown in FIG. 5, and additionally contains an MC replacement unit 118 for replacing block data using a motion vector received from the sending side when cell-discard is detected.

Figure 27:
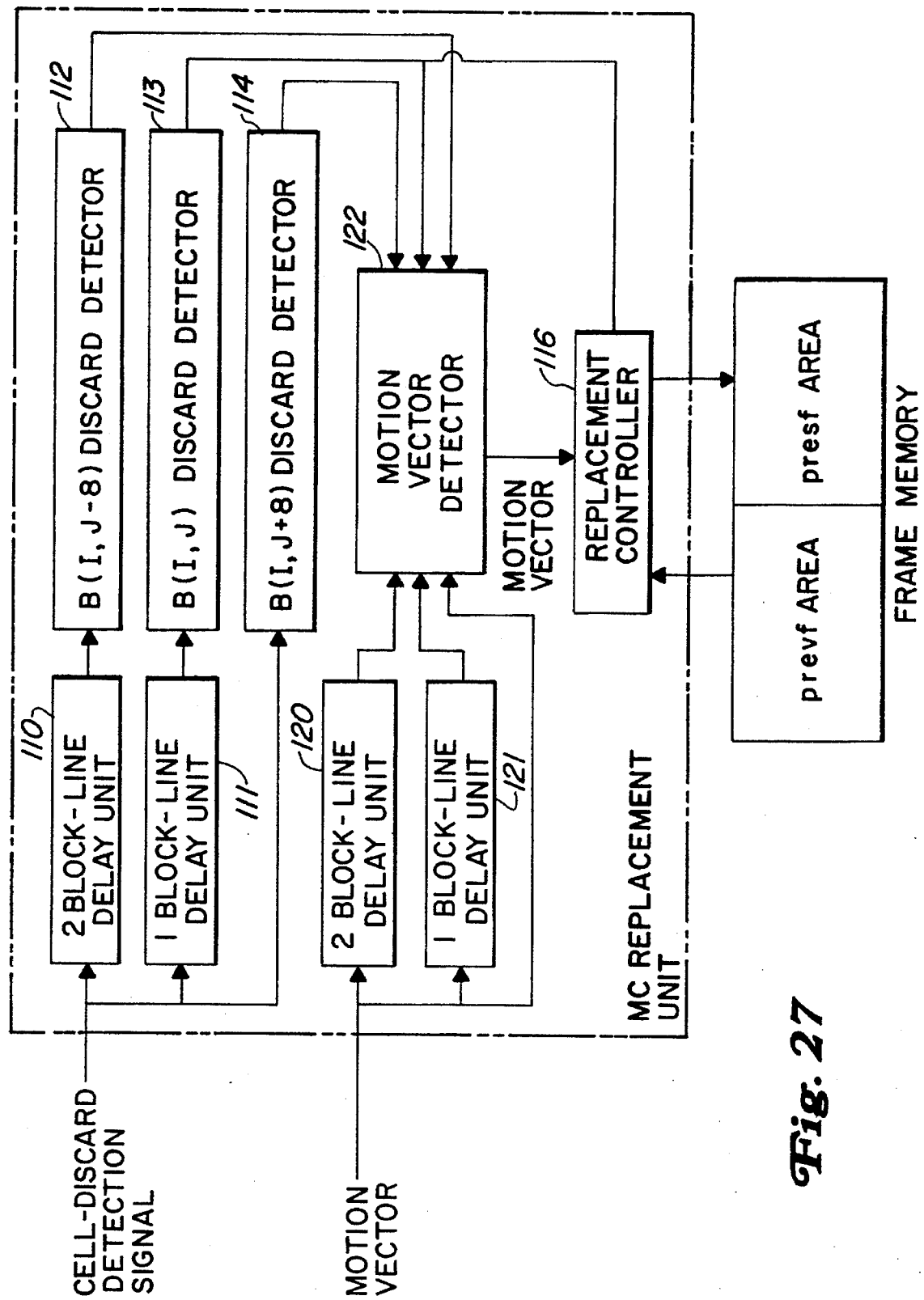
FIG. 27 is a block diagram for explaining the configuration of the MC replacement unit shown in FIG. 26.

FIG. 27 is a configurational block diagram of the MC replacement unit 118 shown in FIG. 26. The configuration shown in FIG. 27 is the same as that shown in FIG. 25 except that a 2-block line delay unit 120 and a 1-block line delay unit 121 for delaying a motion vector are added such that the motion vector can use data received from the sending side, and a motion vector detector 122 outputs the motion vector to the replacement controller 116.

Figure 28:
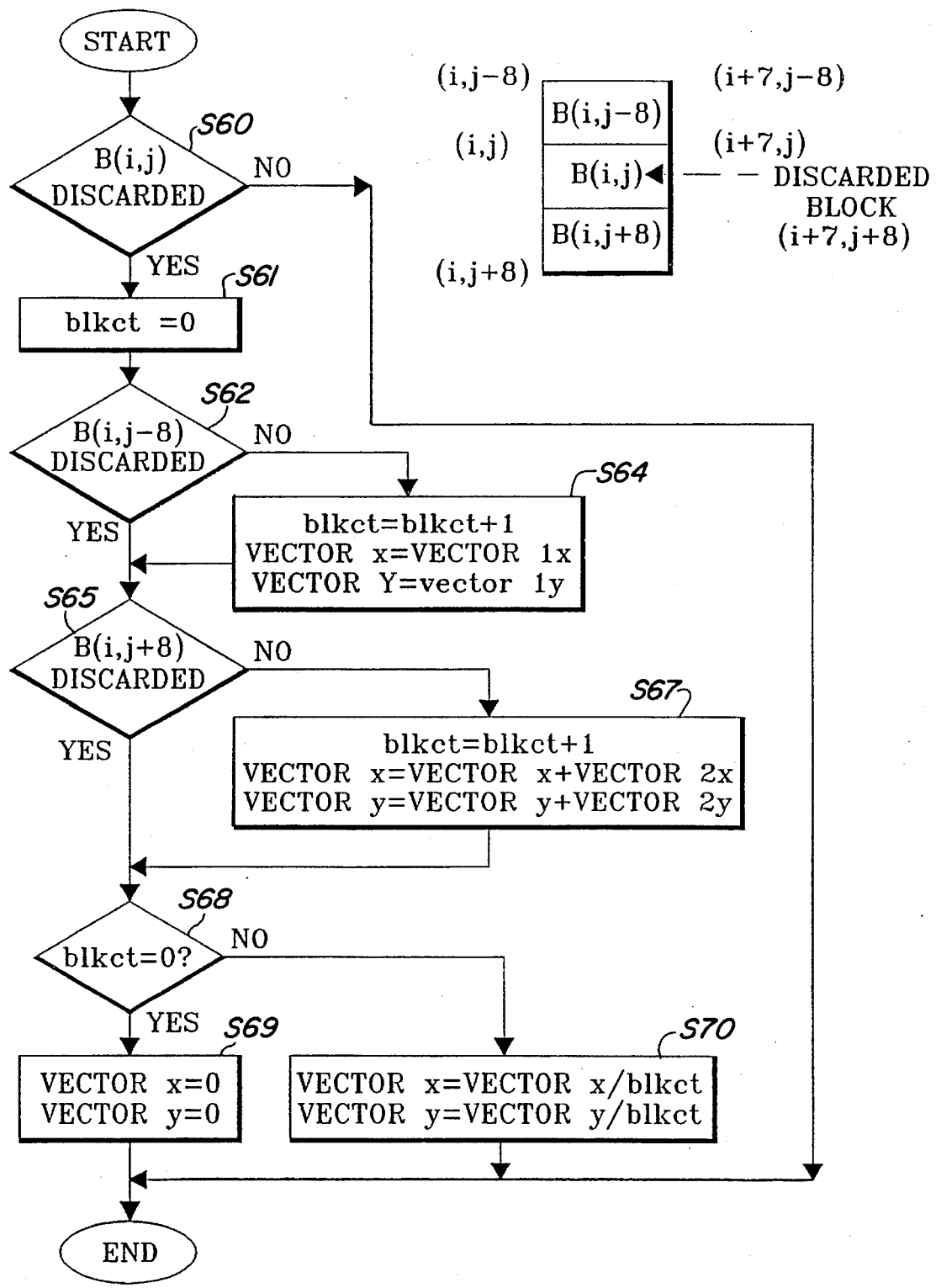
FIG. 28 is a flowchart for explaining the calculation for obtaining an average value of motion vectors shown in FIG. 26.

The flowchart of the data replacement process performed by the replacement controller 116 is the same as that Shown in FIG. 20. When block data are replaced using an average value of motion vectors for the blocks above and below the target block of the replacement, the process of obtaining an average value of motion vectors is the same as that shown in FIG. 21. However, the motion vector itself should be received from the sending side. Therefore, the processed in steps S 63 and S 66 are not required. FIG. 28 is a flowchart for explaining a motion vector average value calculating process. FIG. 28 includes the following abbreviations:

i, j: BLOCK ADDRESS vector x, vector y: VECTOR OF B(i,j)

vector 1x, vector 1y: VECTOR OF b(i,j−8)

vector 2x, vector 2y: VECTOR OF B(i,j+8)

blkct: NUMBER OF SIGNIFICANT BLOCKS.

As described above, the present invention reduces the serious deterioration of image quality caused by cell-discard by, on a sending side, performing a compulsory intra-frame encoding on the next frame after sending data having a comparatively large difference and encoded by the inter-frame encoding system, and by, on a receiving side, replacing the data in a discarded block with a motion vector after detecting it. Thus, the present invention can limit the deterioration of the image quality to a visually acceptable level, and greatly improve the quality of images processed by an image transmission system.

What is claimed is:

1. An image encoding and transmitting system used in an image transmission system for dividing inputted frame image data into blocks comprising a plurality of picture elements, encoding said data in block units, and transmitting said encoded data in packet units, said system comprising:

a motion vector detector on a sending side of said image transmission system for detecting a motion vector for each of said blocks and sending said motion vector to a receiving side, an inverse discrete cosine transform unit on said receiving side for performing an inverse discrete cosine transform on received data, an adder for adding the present frame data as an output from said inverse discrete cosine transform unit to data obtained by multiplying the delay result obtained, by delaying data in the preceding frame according to a motion vector received from said sending side by a leak coefficient α, a frame memory for storing an output of said adder, a motion compensation replacement unit (MC) for replacing the data for a block whose encoded data are not received due to packet-discard using a motion vector received from said sending side and the content stored in said frame memory when a packet discard detection signal is inputted, a variable delay unit for delaying an output from said frame memory according to a motion vector received from said sending side, a leak coefficient unit for multiplying an output from said variable delay unit by a leak coefficient α and outputting the product to said adder.

2. The image encoding and transmitting system according to claim 1, further comprising before said inverse discrete cosine transform unit:

a header remover for removing a header from a received packet, a separator for separating a packet whose header is removed into a sequence number and encoded data, a counter to be stepped up when said packet is received, a comparator for comparing a count value outputted from said counter with a sequence number outputted by said separator, and outputting said detection signal when the discard of a packet is detected, a memory for storing encoded data outputted by said separator, and a read controller for outputting the content stored in said memory when said comparator does not detect the discard of a packet, and outputting dummy data "0" as encoded data to said inverse discrete cosine transform unit.

3. The image encoding and transmitting system according to claim 1, wherein said motion compensation replacement unit comprises:

a 2-block-line delay unit and a 1-block-line delay unit for delaying said packet discard detection signal by 2 block lines and 1 block line, a B(i,j−8) discard detector for detecting the discard of a block above the target block to be replaced according to an output from said 2-block-line delay unit, a B(i,j) discard detector for detecting the discard of said target block to be replaced according to an output from said 1-block-line delay unit, a B(i,j+n) discard detector for detecting the discard of a block below said target block to be replaced according to an input from said packet-discard detection signal, 1-block-line and 2-block-line delay units for delaying a motion vector received from said sending side by 1 block and 2 blocks respectively, a motion vector detector for detecting a motion vector using the outputs from said three discard detectors and two delay units, and the present value of a motion vector received from said sending side, and a replacement controller for replacing data using said detected motion vector.

4. The image encoding and transmitting system according to claim 1, wherein in a data replacement process using said motion vector, determination is made as to whether or not block B(i,j) having its upper left corner point (i,j) is discarded, if no, the process flow is terminated, if yes, the variable y indicating the vertical coordinate is set to "0", the variable x indicating the horizontal coordinate is set to "0", the horizontal coordinate (i+x) and the vertical coordinate (j+y) in the present frame are replaced with the horizontal coordinate (i+x+x component of the motion vector) and the vertical coordinate (j+y+y component of the motion vector) in the preceding frame, the value of the variable x indicating the horizontal coordinate is stepped up, determination is made as to whether or not "x" has reached m, if "x" has not reached m, the processes are repeated from the process in which said present frame data are replaced with the preceding frame data, if "x" has reached m, the value of the variable y is stepped up, determination is made a to whether or not "y" has reached n, if "y" has not reached n, the processes are repeated from the process in which the variable x indicating said horizontal coordinate is set to "0", and if "y" has reached n, the process flow is terminated.

5. The image encoding and transmitting system according to claim 1, wherein an average value of motion vectors of one or more blocks not affected by packet-discard among blocks surrounding the block whose encoded data are not received is used as a motion vector in replacing said block data.

6. The image encoding and transmitting system according to claim 5, wherein in a moving vector average value calculating process, determination is made as to whether or not block B(i,j) having its upper left corner point (i,j) is discarded, if no, the process flow is terminated, if yes, the variable blkct indicating the number of significant blocks for use in detecting a motion vector is set to "0", determination is made as to whether or not block B(i,j−n) above said discarded block B (i,j) is discarded, if said block B(i,j−n) is not discarded, the x component of said motion vector for said block B(i,j−n) received from the sending side is set to vector 1x, and the y component of said motion vector is set to vector 1y, the value of the variable blkct as said number of significant blocks is stepped up, said vector 1x is set as a vector x as the x component of a motion vector to be processed in said average value calculation, and said vector 1y is set as a vector y as the y component of a motion vector to be processed in said average value calculation, if said block B(i,j−n) is discarded, no actions are taken, determination is made whether of not block B(i,j+n) below said discarded block B(i,j) is discarded, if said block B(i,j+n) is not discarded, the x component of the motion vector for said block B(i,j+n) received from the sending side is set to vector 2x, and the y component of the motion vector is set to vector 2y, a value of the variable blkct indicating said number of significant blocks is stepped up, said vector 2x is added to the x component of the motion vector to be processed in said average value calculation to obtain the x component of a new motion vector, said vector 2y is added to the y component of the motion vector to be processed in said average value calculation to obtain the y component of a new motion vector, if said block B(i,i+n) is discarded, no actions are taken, determination is made as to whether or not said variable blkct equals "0", if said variable blkct is "0", the x and y components of the motion vector are set to "0" and the process flow is terminated, and if said variable blkct is not "0", the x component of the motion vector to be processed in said average value calculation is divided by the variable blkct, and the result is assigned as the x component of the motion vector, the y component of the motion vector to be processed in said average value calculation is divided by the variable blkct, and the result is assigned as the y component of the motion vector, and the process flow is terminated.

* * * * *

UNITED STATES PATENT AND TRADEMARK OFFICE
CERTIFICATE OF CORRECTION

PATENT NO. : 5,510,839
DATED : April 23, 1996
INVENTOR(S) : Hamano et al.

It is certified that error appears in the above-indentified patent and that said Letters Patent is hereby corrected as shown below:

Column 2, line 48, delete "process a" and insert --process. A--

Column 4, line 55, delete "fore" and insert --more--

Column 4, line 55, delete "tMan" and insert --than--

Column 8, line 3, delete "kept, at the until" and insert --kept at the maximum until--

Column 11, line 66, start new line before "blkct:"

Column 12, line 54, insert --:-- after "x,y"

Column 13, line 53, delete "mini" and insert --minj--

UNITED STATES PATENT AND TRADEMARK OFFICE
CERTIFICATE OF CORRECTION

PATENT NO. : 5,510,839
DATED : April 23, 1996
INVENTOR(S) : Hamano et al.

It is certified that error appears in the above-indentified patent and that said Letters Patent is hereby corrected as shown below:

Column 13, line 60, delete "iS" and insert --is--

Column 13, line 64, delete "mini" and insert --minj--

Column 16, line 23, delete "B(I, j-8)" and insert --B(I, j-n)--

Column 18, line 2, delete "whether of not" and insert --whether or not--

Signed and Sealed this

Twenty-third Day of December, 1997

Attest:

BRUCE LEHMAN

*Attesting Officer*   *Commissioner of Patents and Trademarks*